United States Patent
Kuramoto

(10) Patent No.: US 11,288,022 B2
(45) Date of Patent: Mar. 29, 2022

(54) HANDHELD PRINTING DEVICE AND DIRECTIONAL ERROR NOTIFICATION PROCESSING

(71) Applicant: SEIKO EPSON CORPORATION, Tokyo (JP)

(72) Inventor: Hiroyuki Kuramoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/158,057

(22) Filed: Jan. 26, 2021

(65) Prior Publication Data

US 2021/0232347 A1 Jul. 29, 2021

(30) Foreign Application Priority Data

Jan. 29, 2020 (JP) .............................. JP2020-012251

(51) Int. Cl.
*G06F 11/07* (2006.01)
*G06F 3/12* (2006.01)

(52) U.S. Cl.
CPC ............ *G06F 3/121* (2013.01); *G06F 3/1234* (2013.01)

(58) Field of Classification Search
CPC ...... G06F 3/121; G06F 3/1234; G06F 3/0346; G06F 3/0354
USPC ................................. 358/1.12, 1.14, 1.5, 3.26
See application file for complete search history.

(56) References Cited

U.S. PATENT DOCUMENTS

| | | | |
|---|---|---|---|
| 5,593,236 A * | 1/1997 | Bobry ........................ | B41J 3/36 347/109 |
| 8,096,713 B1 * | 1/2012 | Bledsoe .................. | H04N 1/107 400/62 |
| 2018/0250947 A1 | 9/2018 | Nakata et al. | |

FOREIGN PATENT DOCUMENTS

JP 2018-144338 A 9/2018

* cited by examiner

*Primary Examiner* — Jamares Q Washington
(74) *Attorney, Agent, or Firm* — Workman Nydegger

(57) ABSTRACT

A printing device printing on a medium while being manually moved in relation to the medium is provided. The printing device includes: a job acquisition unit acquiring a print job designating a direction of movement of the printing device as viewed from the printing device; a print head printing on the medium, based on the print job; a detection unit detecting a direction of movement of the printing device as viewed from the printing device; a direction determination unit determining whether or not a detected direction, which is the direction of movement of the printing device detected by the detection device, is different from a designated direction, which is the direction of movement of the printing device designated by the print job; and a notification control unit performing error notification processing when the direction determination unit determines that the detected direction is different from the designated direction.

10 Claims, 29 Drawing Sheets

HANDHELD PRINTING DEVICE AND DIRECTIONAL ERROR NOTIFICATION PROCESSING

The present application is based on, and claims priority from JP Application Ser. No. 2020-012251, filed Jan. 29, 2020, the disclosure of which is hereby incorporated by reference herein in its entirety.

BACKGROUND

1. Technical Field

The present disclosure relates to a printing device printing on a medium while being manually moved in relation to the medium, and a control method for a printing device.

2. Related Art

According to the related art, a handy mobile printer printing on a medium while being manually moved in relation to the medium (hereinafter referred to as a "handy printer") is known, as disclosed in JP-A-2018-144338. The handy printer can print both while being moved to the right as viewed from the hand printer and while being moved to the left as viewed from the handy printer.

The handy printer according to the related art may print a print image inappropriately when moved in a different direction from a direction of movement designated by a print job.

SUMMARY

According to an aspect of the present disclosure, a printing device printing on a medium while being manually moved in relation to the medium is provided. The printing device includes: a job acquisition unit acquiring a print job designating a direction of movement of the printing device as viewed from the printing device; a print head printing on the medium, based on the print job, while the printing device is moved; a detection unit detecting a direction of movement of the printing device as viewed from the printing device while the printing device is moved; a direction determination unit determining whether or not a detected direction, which is the direction of movement of the printing device detected by the detection device, is different from a designated direction, which is the direction of movement of the printing device designated by the print job; and an error processing unit performing error notification processing when the direction determination unit determines that the detected direction is different from the designated direction.

According to another aspect of the present disclosure, a control method for a printing device printing on a medium while being manually moved in relation to the medium is provided. The control method includes: acquiring a print job designating a direction of movement of the printing device as viewed from the printing device; detecting a direction of movement of the printing device as viewed from the printing device while the printing device is moved; determining whether or not a detected direction, which is the direction of movement of the printing device that is detected, is different from a designated direction, which is the direction of movement of the printing device designated by the print job; and performing error notification processing when the detected direction is determined as being different from the designated direction.

DESCRIPTION OF EXEMPLARY EMBODIMENTS

An embodiment of a printing device and a control method for a printing device will now be described with reference to the accompanying drawings.

Printing System

Figure 1:
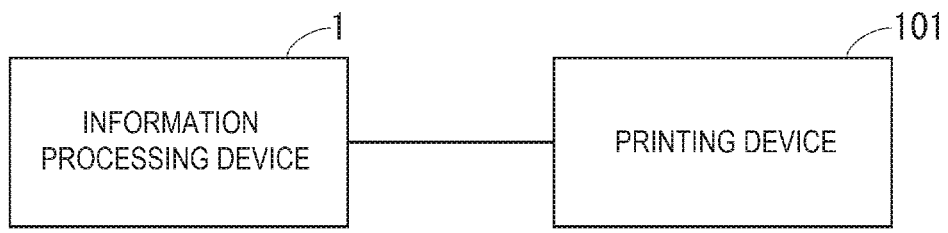
FIG. 1 is a block diagram of a printing system.

As shown in FIG. 1, a printing system Sy has an information processing device 1 and a printing device 101. The information processing device 1 and the printing device 101 are coupled in such a way as to be able to communicate via a wire or wirelessly.

The information processing device 1 transmits a print job to the printing device 101. As the information processing device 1, for example, a smartphone, tablet terminal, personal computer or the like can be used.

The printing device 101 performs printing processing on a medium 201 (see FIG. 5), based on the print job received from the information processing device 1. The printing device 101 is a so-called handy printer and performs printing processing on the medium 201 while being manually moved in relation to the medium 201. The medium 201 is not limited to a print sheet. For example, an envelope, postcard, business card, cardboard, notebook sheet, CD (compact disc) or the like can be used.

External Configuration of Printing Device

Figure 2:
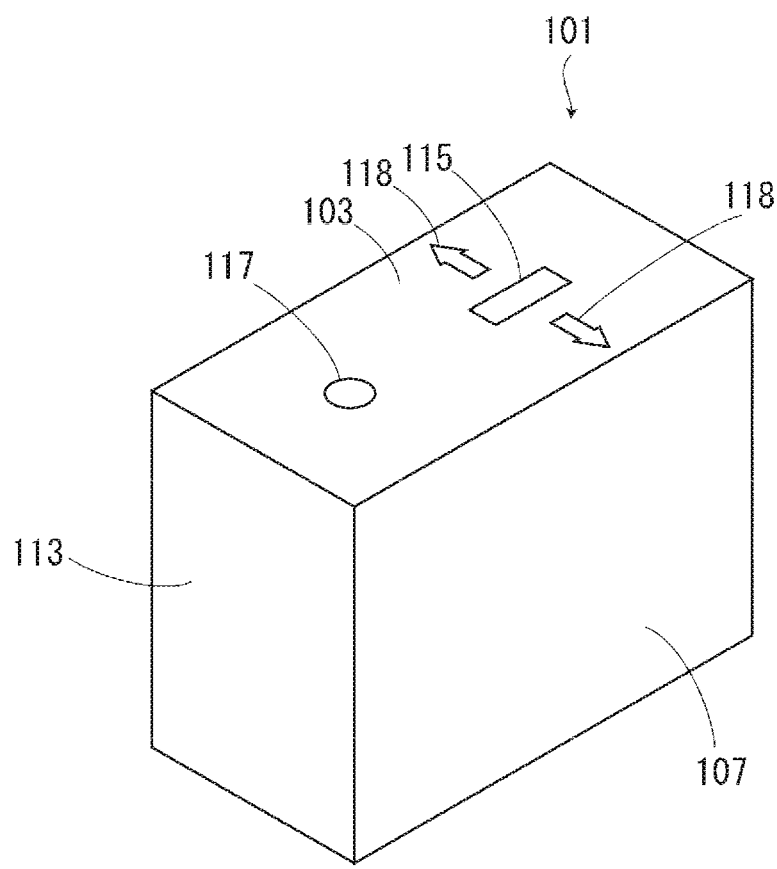
FIG. 2 is an external perspective view of a printing device.
Figure 2:
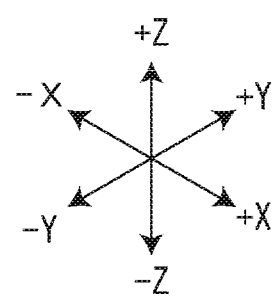
Figure 3:
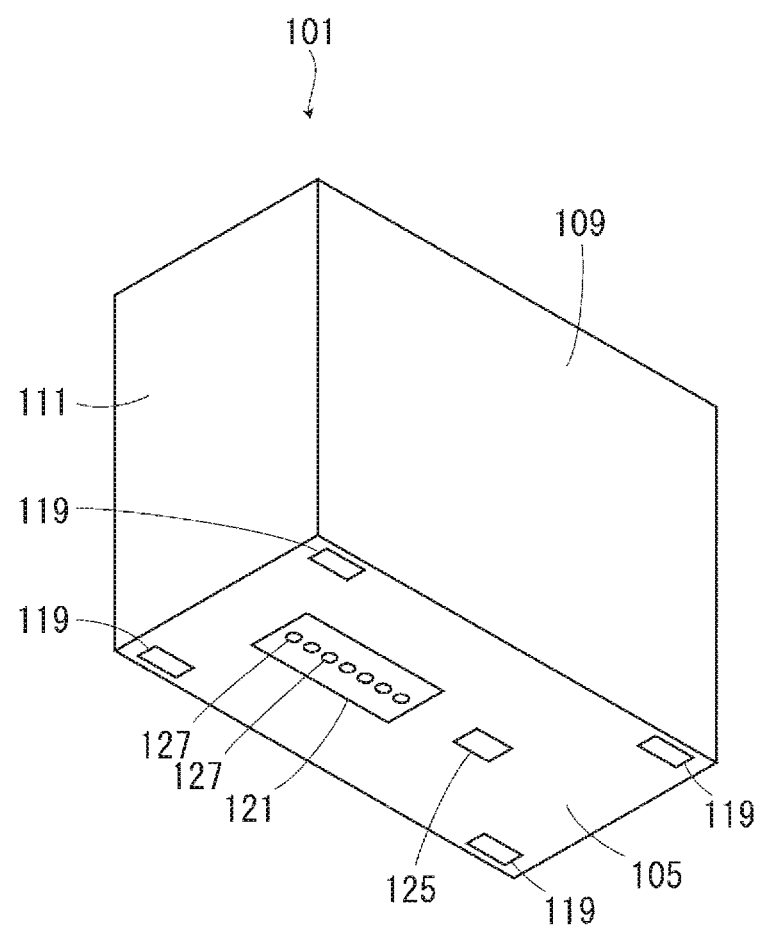
FIG. 3 is an external perspective view of the printing device as viewed from a different angle from FIG. 2.

The external configuration of the printing device 101 will now be described with reference to FIGS. 2 and 3. In the description below, a direction as viewed from the printing device 101 is described using a direction in an XYZ coordinate system illustrated in each drawing. However, such directions are solely for the sake of convenience of the description and should not limit the embodiment described below.

The printing device 101 is formed substantially in the shape of a rectangular parallelepiped. Of the six outer surfaces of the printing device 101, an outer surface where a print button 115, described later, is provided is referred to as a first outer surface 103. An outer surface opposite to the first outer surface 103 is referred to as a second outer surface 105. Of the four outer surfaces equivalent to the lateral surfaces when the first outer surface 103 or the second outer surface 105 is regarded as the bottom surface, one of the two outer surfaces having a large area is referred to as a third outer surface 107 and the other is referred to as a fourth outer surface 109. Also, of the four outer surfaces equivalent to the lateral surfaces, one of the two outer surfaces having a small area is referred to as a fifth outer surface 111 and the other is referred to as a sixth outer surface 113. That is, the first outer surface 103, the second outer surface 105, the third outer surface 107, the fourth outer surface 109, the fifth outer surface 111, and the sixth outer surface 113 are provided in a +Z direction, a −Z direction, a +X direction, a −X direction, a +Y direction, and a −Y direction, respectively, as viewed from the printing device 101.

At the first outer surface 103 of the printing device 101, the print button 115, a power button 117, and two direction notification indicators 118 are provided.

Figure 5:
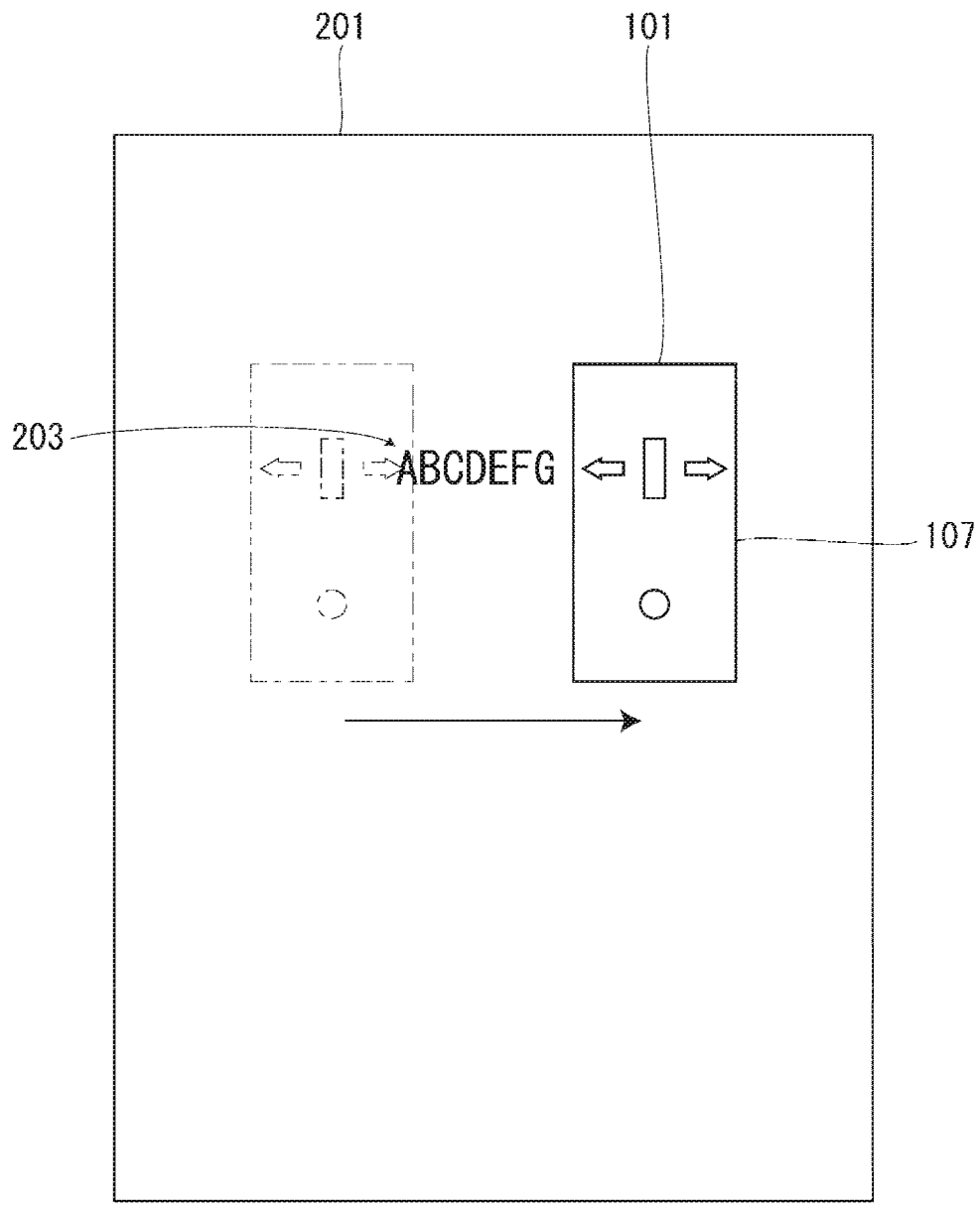
FIG. 5 shows a state where the printing device is moved in a +X direction as a result of a user moving the printing device to the right as viewed from the user.

The print button 115 accepts an instruction to start printing from a user 301 (see FIG. 5). The print button 115 is provided in the +Y direction in relation to a center part of the first outer surface 103. The print button 115 is provided in the +Z direction in relation to a print head 121. That is, the print button 115 is provided at a position corresponding to the print head 121, on the first outer surface 103. The user 301 places the printing device 101 on the medium 201, subsequently presses the print button 115, then moves freehand the printing device 101 held in the hand along the surface of the medium 201, and thus can cause the printing device 101 to print a print image 203 (see FIG. 5).

The power button 117 accepts an instruction to switch on or off the power from the user 301. The power button 117 is provided in the −Y direction in relation to the center part of the first outer surface 103.

Figure 4:
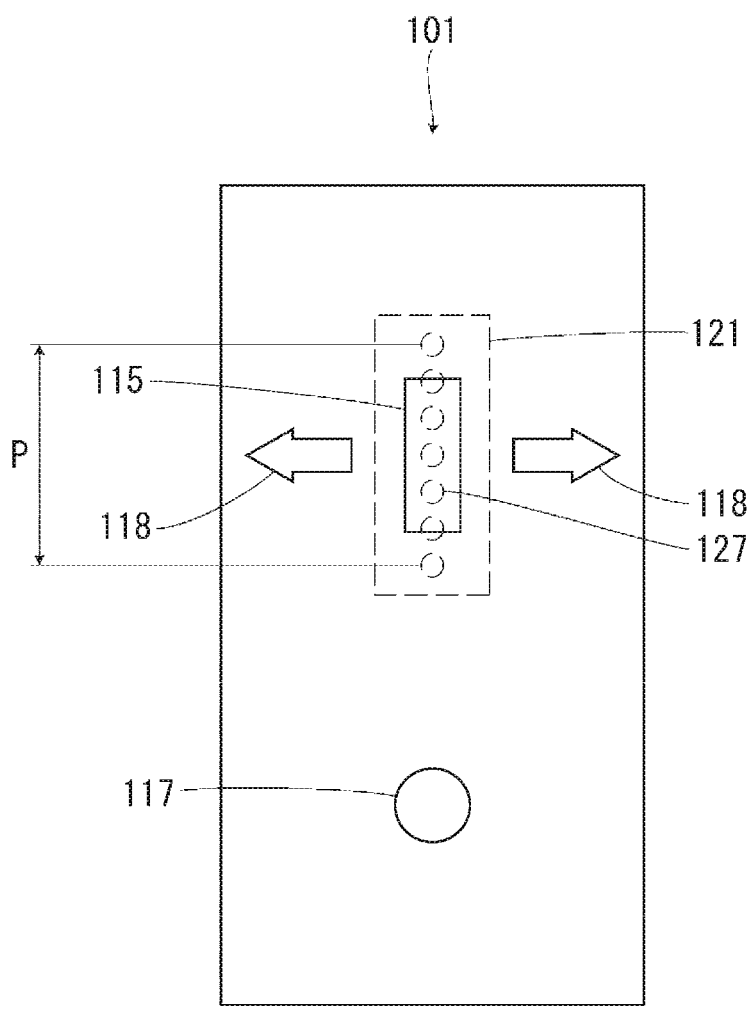
FIG. 4 shows the printing device as viewed from a +Z direction.

The two direction notification indicators 118, which will be described in detail later, notify the user 301 of a direction in which the printing device 101 should be moved when printing. As the direction notification indicators 118, for example, an LED (light-emitting diode) lamp can be used. One direction notification indicator 118 is provided in the +X direction in relation to the print button 115. The other direction notification indicator 118 is provided in the −X direction in relation to the print button 115. The two direction notification indicators 118 are located at a position corresponding to the print head 121 in the Y-direction (see FIG. 4). That the direction notification indicators 118 are located at a position corresponding to the print head 121 in the Y-direction means that the direction notification indicators 118 are located within the range of the print head 121 in the Y-direction. Thus, the direction notification indicators 118 can indicate to the user 301 the position where the print head 121 is provided, that is, the position of a printable range P with the print head 121.

At the second outer surface 105 of the printing device 101, a plurality of rollers 119, the print head 121, and a movement detection sensor 125 are provided.

The plurality of rollers 119 slide in contact with the medium 201 to rotate and thus guide the movement of the printing device 101 in the X-direction in relation to the medium 201.

The print head 121 is an inkjet head having a plurality of nozzles 127. The print head 121 ejects ink from the plurality of nozzles 127 and thus prints the print image 203 on the medium 201. The print head 121 is provided in the +Y direction in relation to a center part of the second outer surface 105. That is, the print head 121 is provided in the −Z direction in relation to the print button 115. The plurality of nozzles 127 are arrayed in the Y-direction.

The movement detection sensor 125 scans the medium 201 while the printing device 101 is moved in relation to the medium 201, and outputs a movement detection signal that is pixel data on the medium 201. The printing device 101 calculates a distance of movement of the printing device 101 in the X-direction, based on the movement detection signal outputted from the movement detection sensor 125. The print head 121 ejects ink from the plurality of nozzles 127 at a timing based on the calculated distance of movement of the printing device 101. Thus, the printing device 101 can properly print the print image 203 on the medium 201 regardless of the speed at which the user 301 moves the printing device 101. The movement detection sensor 125 is provided in the −Y direction in relation to the print head 121.

Figure 6:
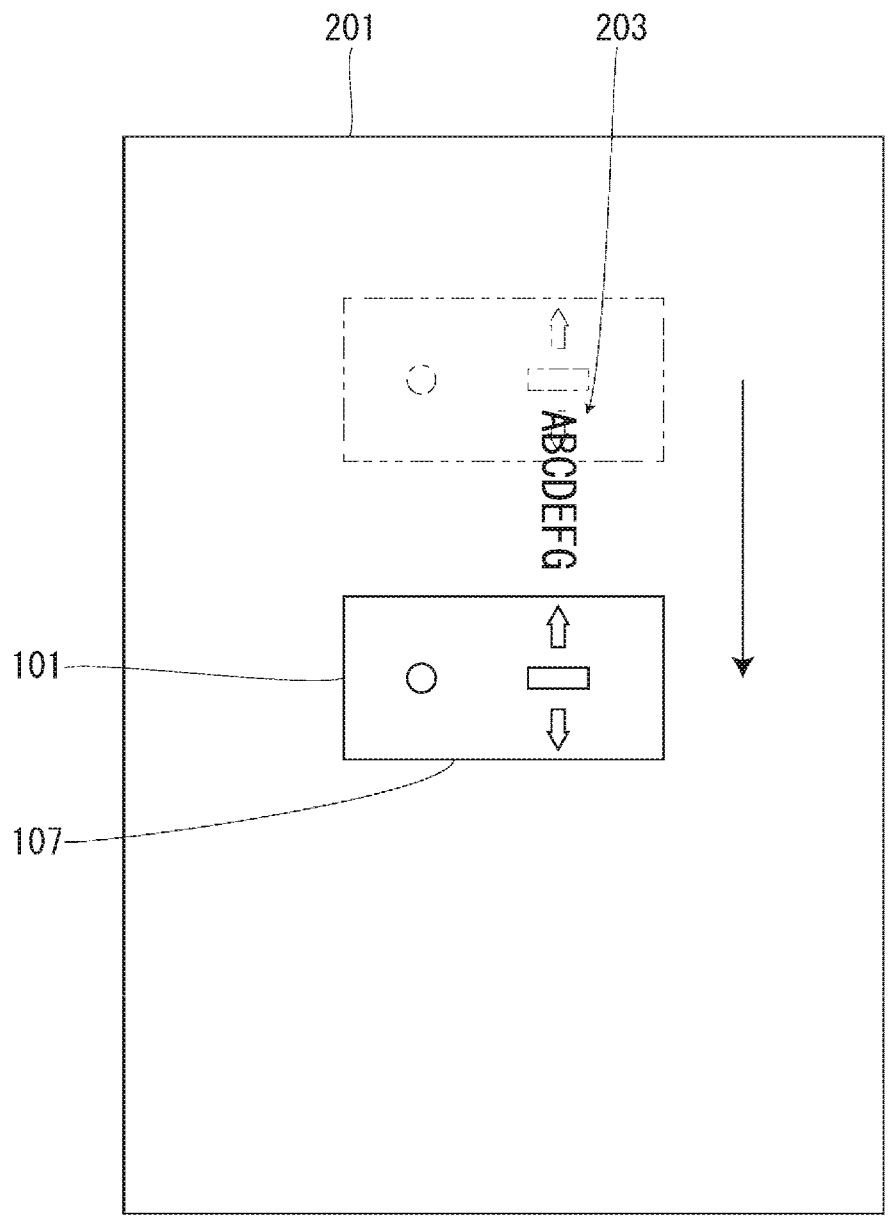
FIG. 6 shows a state where the printing device is moved in the +X direction as a result of the user moving the printing device to the front as viewed from the user.

The printing device 101 can print the print image 203 on the medium 201 while the printing device 101 is moved in the +X direction as viewed from the printing device 101 and while the printing device 101 is moved in the −X direction as viewed from the printing device 101. That the printing device 101 is moved in the +X direction as viewed from the printing device 101 means that the printing device 101 is moved in such a way that the third outer surface 107 becomes the front face. That the printing device 101 is moved in the −X direction as viewed from the printing device 101 means that the printing device 101 is moved in such a way that the fourth outer surface 109 becomes the front face. For example, when the user 301 moves the printing device 101 to the right in the state where the third outer surface 107 faces to the right as viewed from the user 301, as shown in FIG. 5, the printing device 101 is moved in such a way that the third outer surface 107 becomes the front face. Therefore, the printing device 101 is moved in the +X direction as viewed from printing device 101. Also, when the user 301 moves the printing device 101 to the front in the state where the third outer surface 107 faces to the front as viewed from the user 301, as shown in FIG. 6, the printing device 101 is moved in such a way that the third outer surface 107 becomes the front face. Therefore, the printing device 101 is moved in the +X direction as viewed from printing device 101.

The movement of printing device 101 when printing is also referred to as a path. The printing device 101 can execute one print job divided into a plurality of paths. In this case, the user 301 selects one of a one-direction mode and a two-direction mode as a movement direction mode via the information processing device 1.

Figure 7:
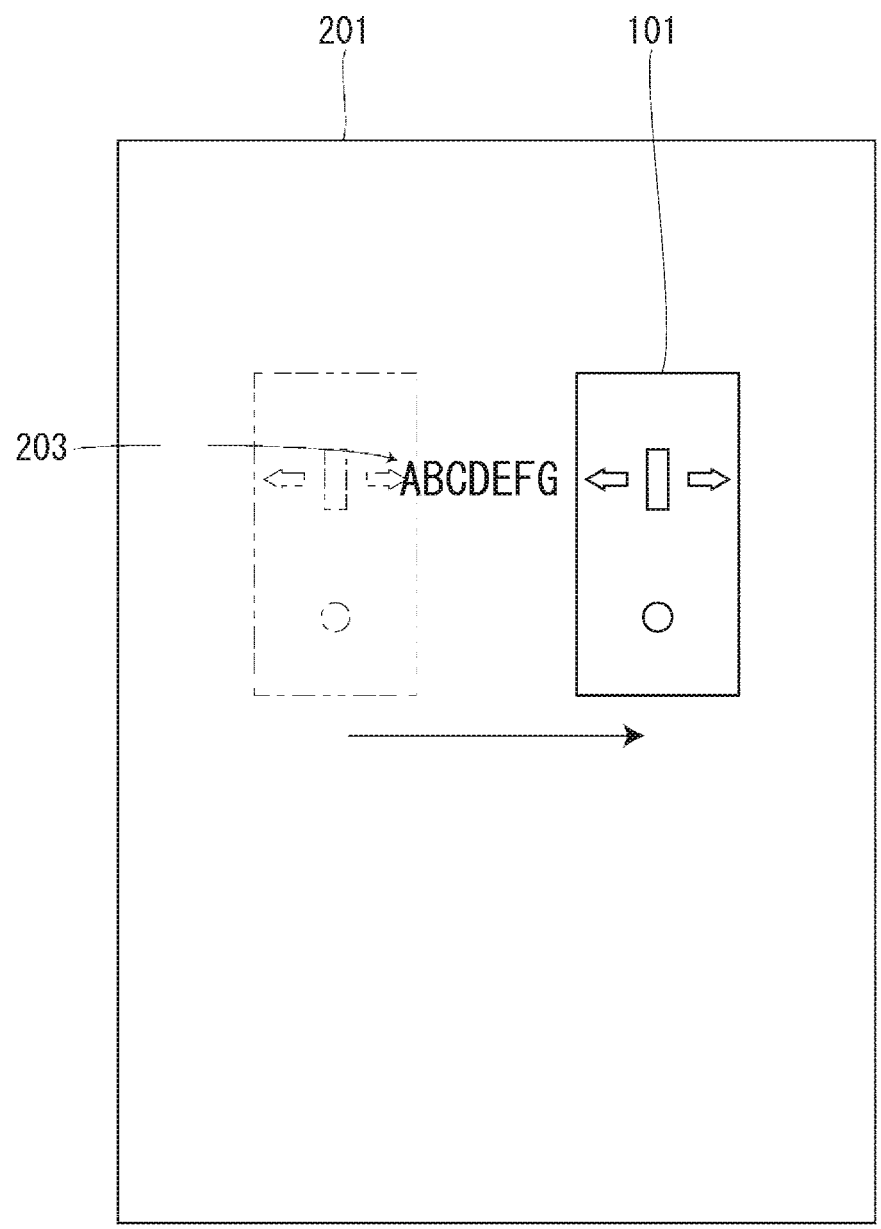
FIG. 7 shows a state where a first path is performed in a one-direction mode.
Figure 8:
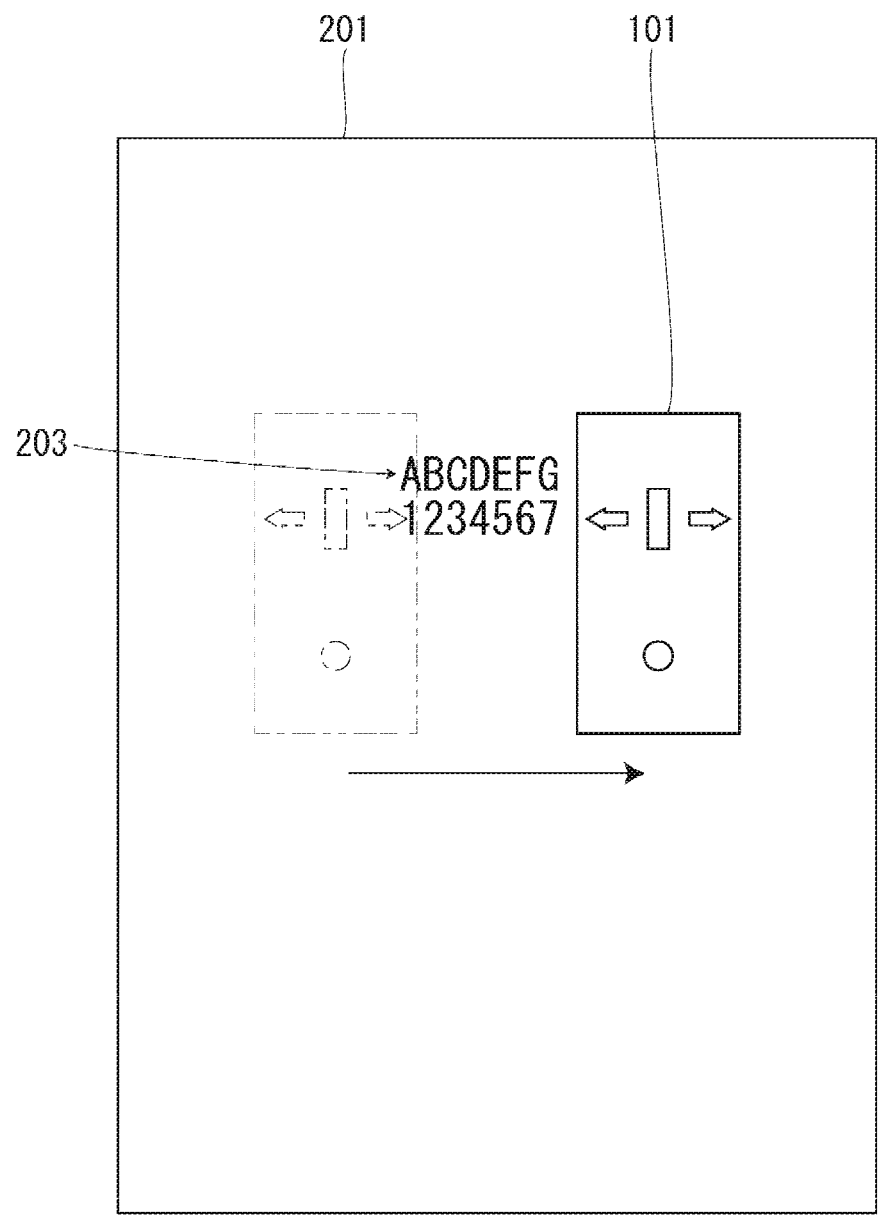
FIG. 8 shows a state where a second path is performed in the one-direction mode.
Figure 8:
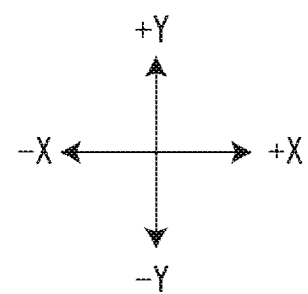

In the one-direction mode, when the printing device 101 executes one print job divided into a plurality of paths, the direction of movement of the printing device 101 is the +X direction in any of the plurality of paths. For example, in the first path, the printing device 101 prints a letter string "ABCDEFG" in the first line while being moved in the +X direction, and in the second path, the printing device 101 prints a letter string "1234567" in the second line while being moved in the +X direction, as shown in FIGS. 7 and 8.

Figure 9:
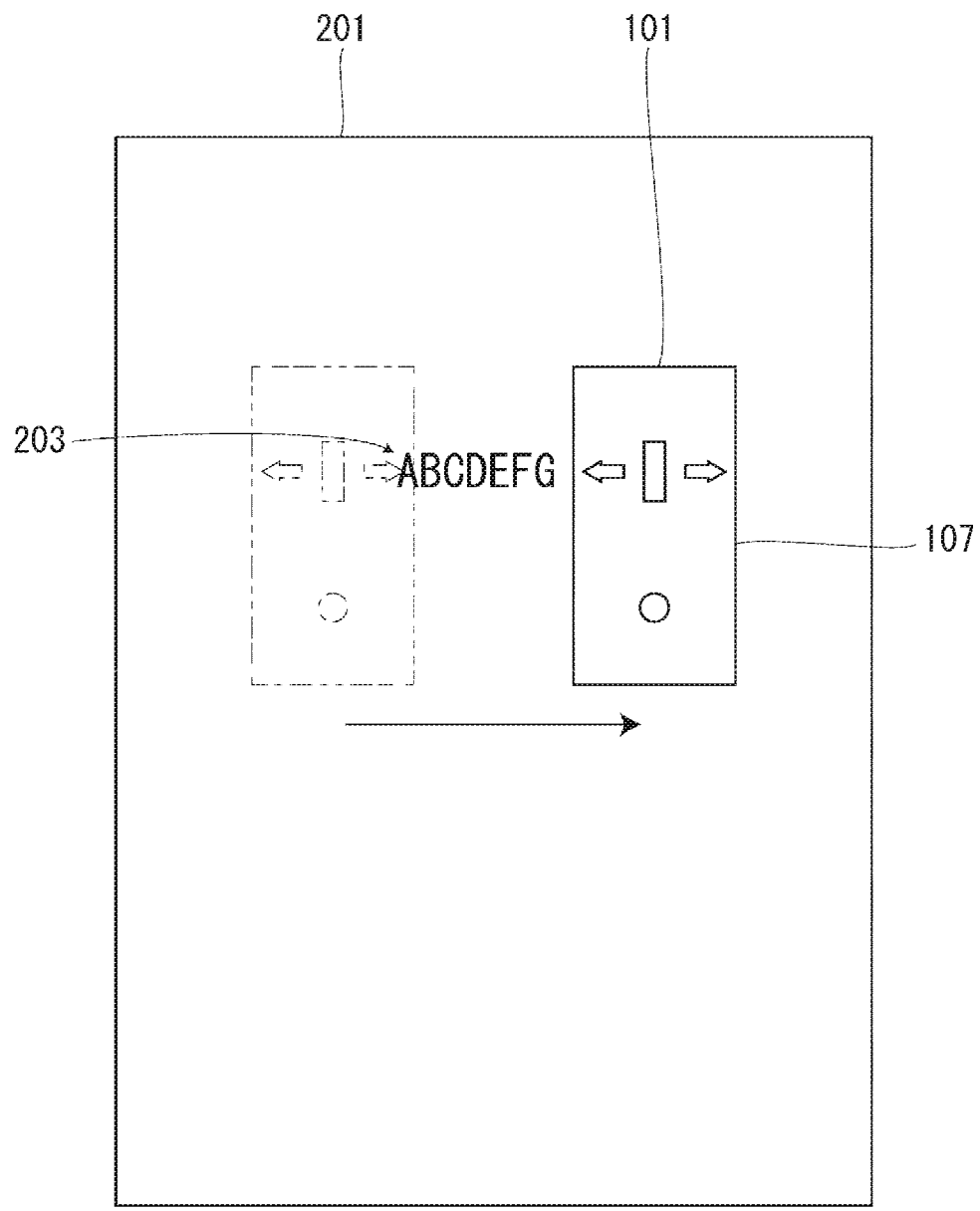
FIG. 9 shows a state where a first path is performed in a two-direction mode.
Figure 9:
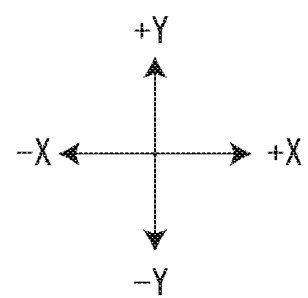
Figure 10:
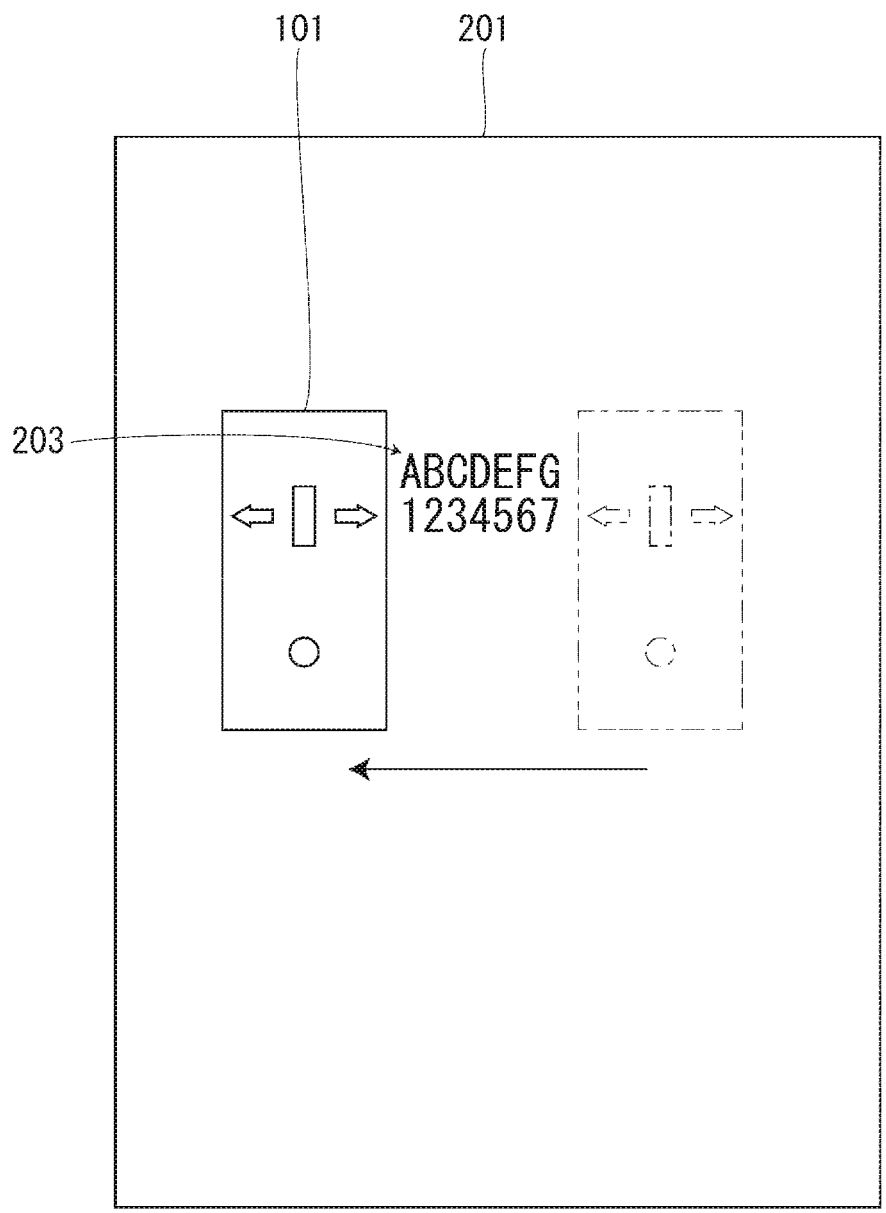
FIG. 10 shows a state where a second path is performed in the two-direction mode.

In the two-direction mode, when the printing device 101 executes one print job divided into a plurality of paths, the direction of movement of the printing device 101 switches between the +X direction and the −X direction alternately every path. For example, in the first path, the printing device 101 prints a letter string "ABCDEFG" in the first line while being moved in the +X direction, and in the second path, the printing device 101 prints a letter string "1234567" in the second line while being moved in the −X direction, as shown in FIGS. 9 and 10.

The print job transmitted from the information processing device 1 designates a direction of movement of the printing device 101 for each path. That is, in the one-direction mode, the +X direction is designated as the direction of movement of the printing device 101 for any of a plurality of paths included in the print job. In the two-direction mode, the +X direction is designated as the direction of movement of the printing device 101 for paths with odd ordinal numbers, of a plurality of paths included in the print job, and the −X direction is designated as the direction of movement of the printing device 101 for paths with even ordinal numbers. Print data included in the print job corresponds to the direction of movement of the printing device 101. However, the user 301 may move the printing device 101 in the wrong direction, for example, as when the user 301 moves the printing device 101 in the −X direction in a path with an even ordinal number despite having selected the one-direction mode. When the direction in which the printing device 101 is moved is different from the direction of movement of the printing device 101 designated by the print job, a configuration that does not perform error notification processing, unlike the printing device 101 in this embodiment, may result in the printing device 101 printing the print image 203 inappropriately, such as reversing the print image 203 left to right. Thus, the printing device 101 in this embodiment is configured to perform error notification processing when a detected direction is different from a designated direction, and thus restrain inappropriate printing of the print image 203, as will be described in detail later. The detected direction means the direction of movement of the printing device 101 detected by a detection unit 137 (see FIG. 15). The designated direction means the direction of movement of the printing device 101 designated by the print job.

Hardware Configuration of Information Processing Device

Figure 11:
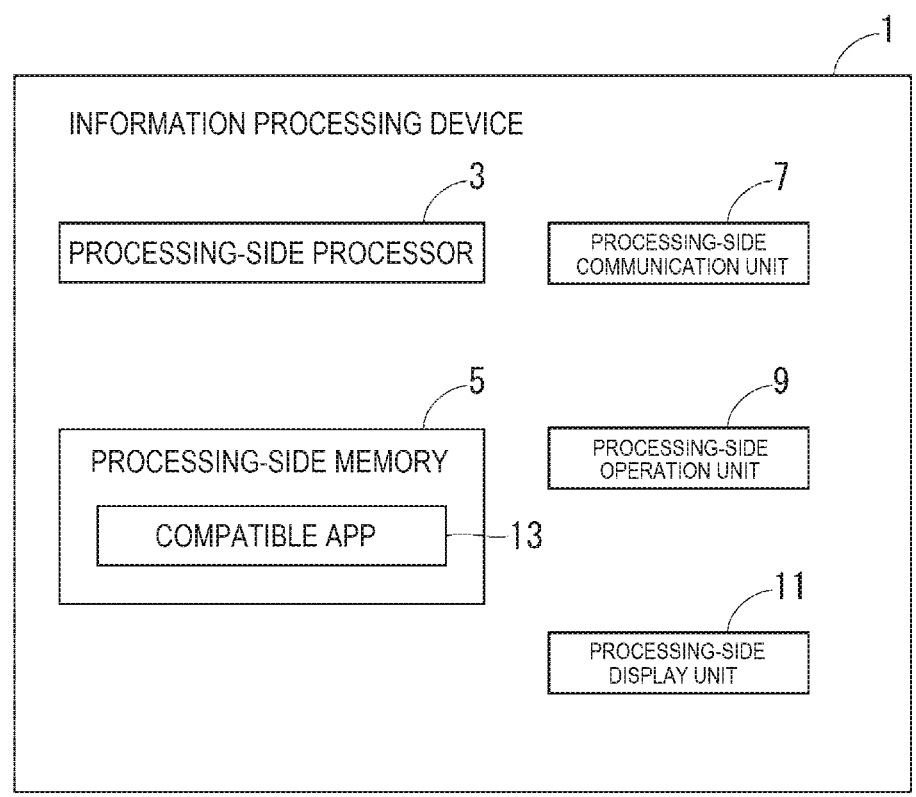
FIG. 11 is a block diagram showing the hardware configuration of an information processing device.

As shown in FIG. 11, the information processing device 1 has a processing-side processor 3, a processing-side memory 5, a processing-side communication unit 7, a processing-side operation unit 9, and a processing-side display unit 11.

The processing-side processor 3 executes various programs stored in the processing-side memory 5. The processing-side processor 3 is, for example, one or a plurality of CPUs (central processing units). The processing-side processor 3 may be a hardware circuit such as an ASIC (application-specific integrated circuit) or may be formed of one or more CPUs and a hardware circuit cooperating with each other to perform processing.

The processing-side memory 5 stores various programs and various data. The processing-side memory 5 has, for example, a ROM (read-only memory), a RAM (random-access memory), and an EEPROM (electrically erasable programmable read-only memory). The processing-side memory 5 may also have an HDD (hard disk drive), an SSD (solid-state drive), and the like.

The various programs stored in the processing-side memory 5 include a compatible app 13. The compatible app 13 is an application program compatible with the printing device 101. The processing-side processor 3 executes the compatible app 13 and thus executes printing control processing, described later.

The processing-side communication unit 7 transmits and receives various data and various commands to and from the printing device 101. The processing-side communication unit 7 has a communication circuit communicating with the printing device 101 via a wire or wirelessly.

The processing-side operation unit 9 accepts an operation by the user 301. As the processing-side operation unit 9, for example, a touch panel, a keyboard, a mouse or the like can be used.

The processing-side display unit 11 displays various screens. As the processing-side display unit 11, for example, a liquid crystal display or an organic EL (electroluminescence) display can be used.

Hardware Configuration of Printing Device

Figure 12:
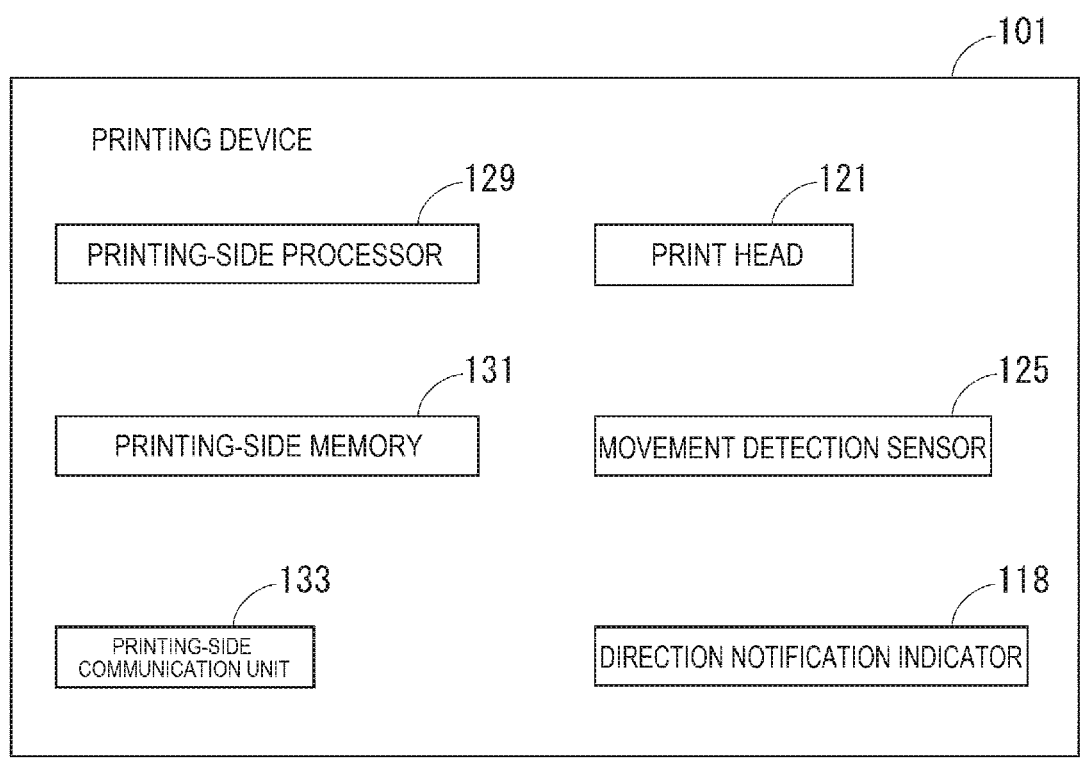
FIG. 12 is a block diagram showing the hardware configuration of the printing device.

As shown in FIG. 12, the printing device 101 has a printing-side processor 129, a printing-side memory 131, a printing-side communication unit 133, the print head 121, the movement detection sensor 125, and the direction notification indicator 118.

The printing-side processor 129 executes various programs stored in the printing-side memory 131. The printing-side processor 129 is, for example, one or a plurality of CPUs. The printing-side processor 129 may be a hardware circuit such as an ASIC or may be formed of one or more CPUs and a hardware circuit cooperating with each other to perform processing.

The printing-side memory 131 stores various programs and various data. The printing-side memory 131 has, for example, a ROM and a RAM. The printing-side memory 131 may also have an EEPROM, an HDD, an SSD, and the like.

The printing-side communication unit 133 transmits and receives various data and various commands to and from the information processing device 1. The printing-side communication unit 133 has a communication circuit communicating with the information processing device 1 via a wire or wirelessly.

First Embodiment

The printing device 101 in this embodiment performs error notification processing when the detected direction is different from the designated direction, as described above. In the first embodiment, when the detected direction is different from the designated direction, the printing device 101 notifies the user 301 that the printing device 101 has been moved in a different direction from the designated direction, as error notification processing.

Functional Configuration of Information Processing Device in First Embodiment

Figure 13:
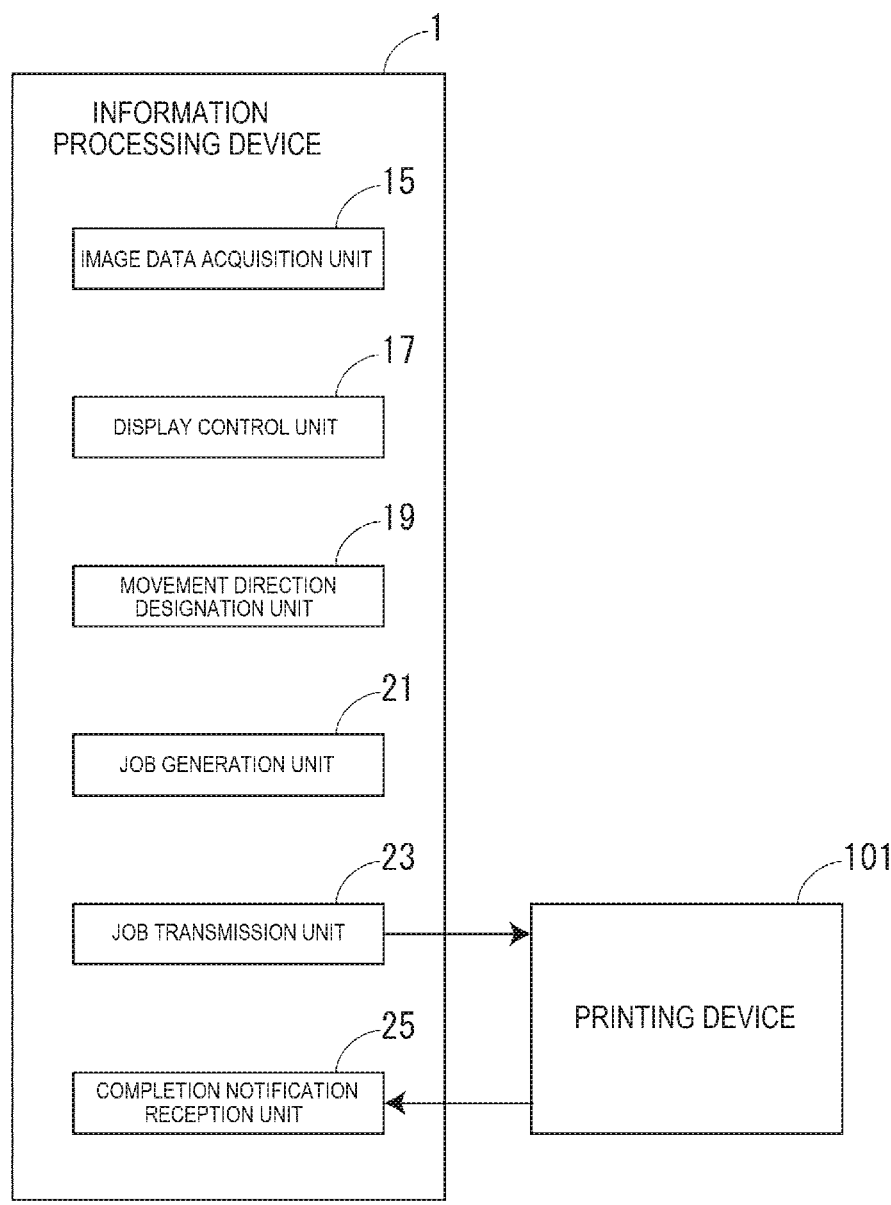
FIG. 13 is a block diagram showing the functional configuration of the information processing device in a first embodiment.

The functional configuration of the information processing device 1 in the first embodiment will now be described with reference to FIG. 13. The information processing device 1 has an image data acquisition unit 15, a display control unit 17, a movement direction designation unit 19, a job generation unit 21, a job transmission unit 23, and a completion notification reception unit 25. These functional units are implemented by the processing-side processor 3 executing the compatible app 13.

The image data acquisition unit 15 acquires image data for the printing device 101 to print the print image 203. The image data may be, for example, image data based on an input operation to input a character or the like to the information processing device 1, shooting data shot by the information processing device 1 having a shooting function, or image data received by the information processing device 1 from another device.

Figure 14:
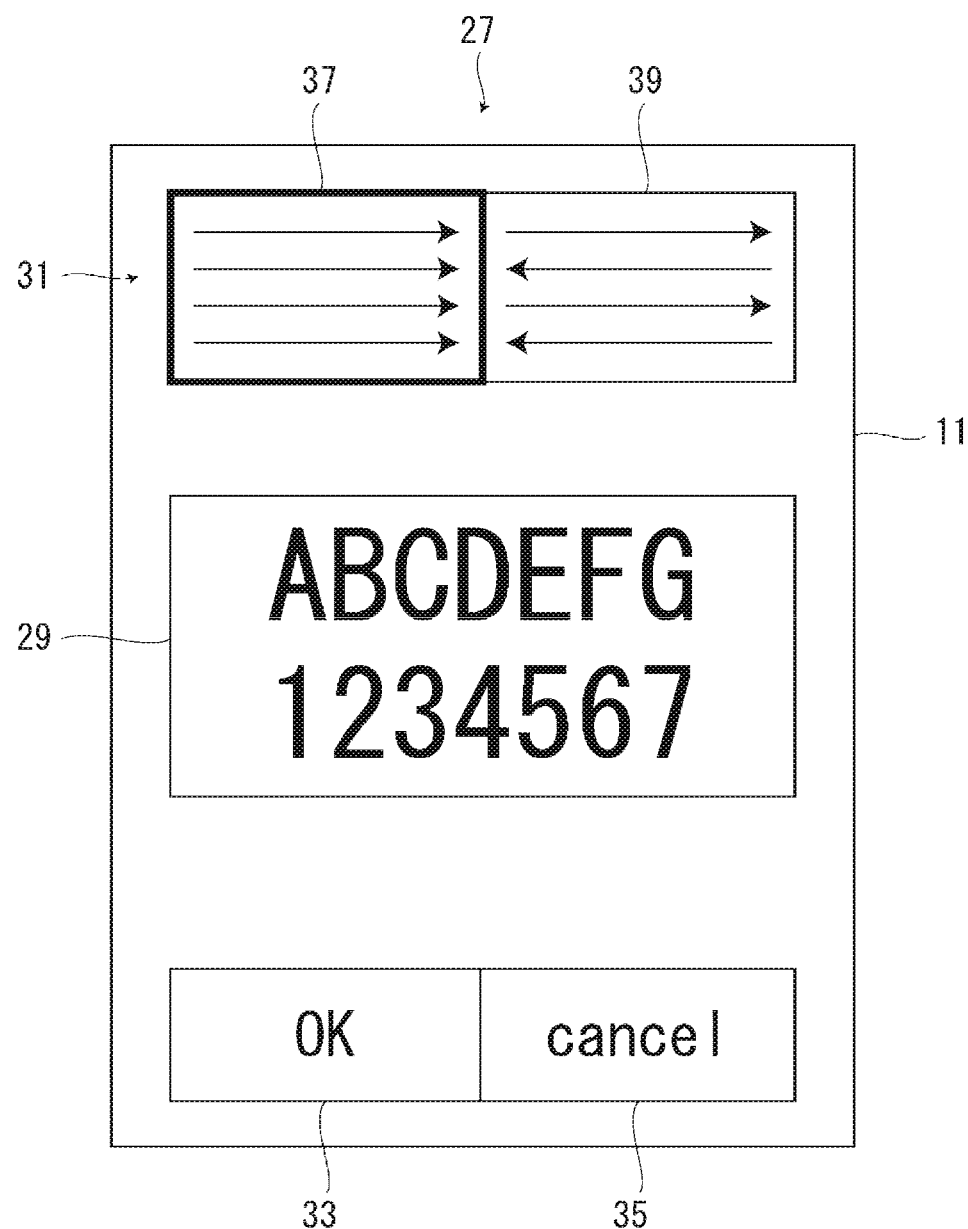
FIG. 14 shows a print setting screen.

The display control unit 17 controls the processing-side display unit 11 in such a way that the processing-side display unit 11 displays a print setting screen 27 shown in FIG. 14. On the print setting screen 27, a print condition such as a movement direction mode is set. On the print setting screen 27, a print preview 29, a mode selection section 31, an OK button 33, and a cancel button 35 are provided.

In the print preview 29, a preview of the print image 203 is displayed, based on the image data acquired by the image data acquisition unit 15.

In the mode selection section 31, a one-direction mode option 37 and a two-direction mode option 39 are displayed as selectable options. When the print image 203 is printed in one path, the display control unit 17 may display only the one-direction mode option 37 as a selectable option and may display the two-direction mode option 39 as an option which is not selectable.

The OK button 33 accepts an operation to finalize the selection on the print setting screen 27. The cancel button 35 accepts an operation to cancel the selection on the print setting screen 27 and return to an editing screen (not illustrated) that accepts an input of a character or the like.

The movement direction designation unit 19 designates a direction of movement of the printing device 101 for each path, based on the result of selecting a movement direction mode on the print setting screen 27. That is, when the one-direction mode option 37 is selected on the print setting screen 27, the movement direction designation unit 19 designates the +X direction as the direction of movement of the printing device 101 for any of a plurality of paths included in the print job. When the two-direction mode option 39 is selected on the print setting screen 27, the movement direction designation unit 19 designates the +X direction as the direction of movement of the printing device 101 for paths with odd ordinal numbers, of a plurality of path included in the print job, and designates the −X direction as the direction of movement of the printing device 101 for paths with even ordinal numbers.

The job generation unit 21 generates a print job, based on the image data acquired by the image data acquisition unit 15 and the designated direction for each path designated by the movement direction designation unit 19. The print job includes a plurality of print data corresponding to a plurality of paths. For example, when the two-direction mode is selected, the job generation unit 21 generates print data corresponding to paths with odd ordinal numbers in such a way that the print image 203 is properly printed when the printing device 101 is moved in the +X direction, which is the designated direction. Also, when the two-direction mode is selected, the job generation unit 21 generates print data corresponding to paths with even ordinal numbers in such a way that the print image 203 is properly printed when the printing device 101 is moved in the −X direction, which is the designated direction.

The job transmission unit 23 transmits the print job generated by the job generation unit 21 to the printing device 101.

The completion notification reception unit 25 receives a print completion notification transmitted from the printing device 101.

Functional Configuration of Printing Device in First Embodiment

Figure 15:
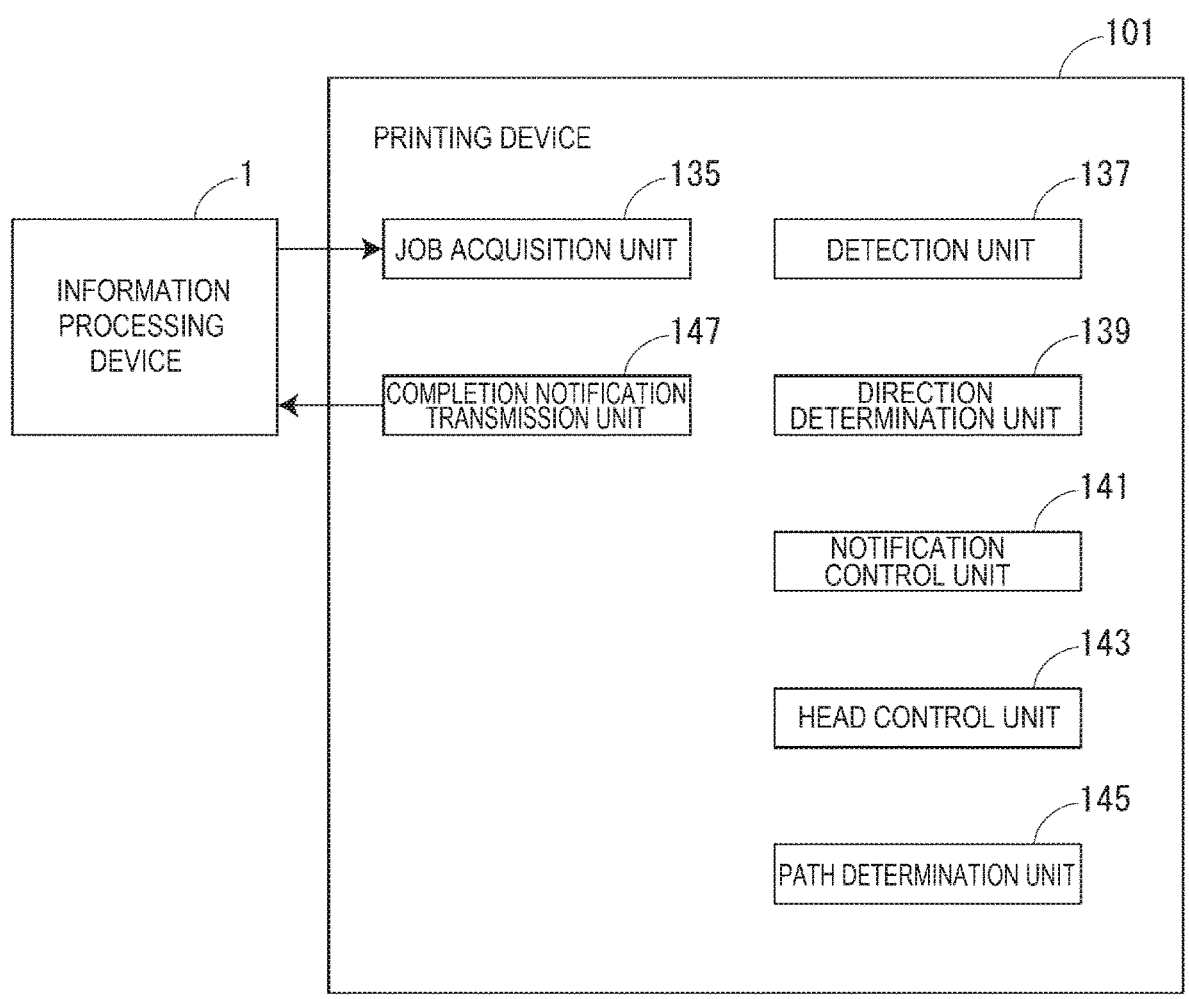
FIG. 15 is a block diagram showing the functional configuration of the printing device in the first embodiment.

The functional configuration of the printing device 101 in the first embodiment will now be described with reference to FIG. 15. The printing device 101 has a job acquisition unit 135, a detection unit 137, a direction determination unit 139, a notification control unit 141, a head control unit 143, a path determination unit 145, and a completion notification transmission unit 147. These functional units are implemented by the printing-side processor 129 executing a program stored in the printing-side memory 131.

The job acquisition unit 135 acquires a print job transmitted from the information processing device 1.

The detection unit 137 detects the direction of movement of the printing device 101, based on a movement detection signal outputted from the movement detection sensor 125, while the printing device 101 is moved.

The direction determination unit 139 determines whether the detected direction is different from the designated direction or not. The detected direction means the direction of movement of the printing device 101 detected by the detection unit 137. The designated direction means the direction of movement of the printing device 101 designated by the print job.

When the direction determination unit 139 determines that the detected direction is different from the designated direction, the notification control unit 141 controls the direction notification indicators 118 in such a way that, of the two direction notification indicators 118, the direction notification indicator 118 indicating the designated direction flashes on and off, as error notification processing. Thus, the direction notification indicator 118 notifies the user 301 that the printing device 101 has been moved in a different direction from the designated direction, and also notifies the user 301 of the designated direction. Therefore, when the printing device 101 has been moved in a different direction from the designated direction, the user 301 can be made aware that the printing device 101 has been moved in a different direction from the designated direction, and the user 301 can be guided to move the printing device 101 in the designated direction. In this way, the notification control unit 141 functions as an "error processing unit" performing error notification processing.

The notification control unit 141 also controls the direction notification indicators 118 in such a way that, of the two direction notification indicators 118, the direction notification indicator 118 indicating the designated direction turns on, as non-error notification processing that is different from error notification processing, after the print button 115 is pressed. Thus, the direction notification indicator 118 notifies the user 301 of the designated direction. Therefore, before starting moving the printing device 101, the user 301 can be guided in advance to move the printing device 101 in the designated direction.

In this way, the notification control unit 141 controls the direction notification indicator 118 in such a way that the direction notification indicator 118 notifies the designated direction in different forms between error notification processing and non-error notification processing. This can make the user 301 recognize whether the notification by the direction notification indicator 118 is a notification based on error notification processing or a notification based on non-error notification processing.

The head control unit 143 controls the print head 121, based on the print job.

The path determination unit 145 determines whether one path is finished or not, after printing is started. The path determination unit 145 also determines whether there is an unexecuted path or not, after each path is finished.

Printing Control Processing and Printing Processing in First Embodiment

Figure 16:
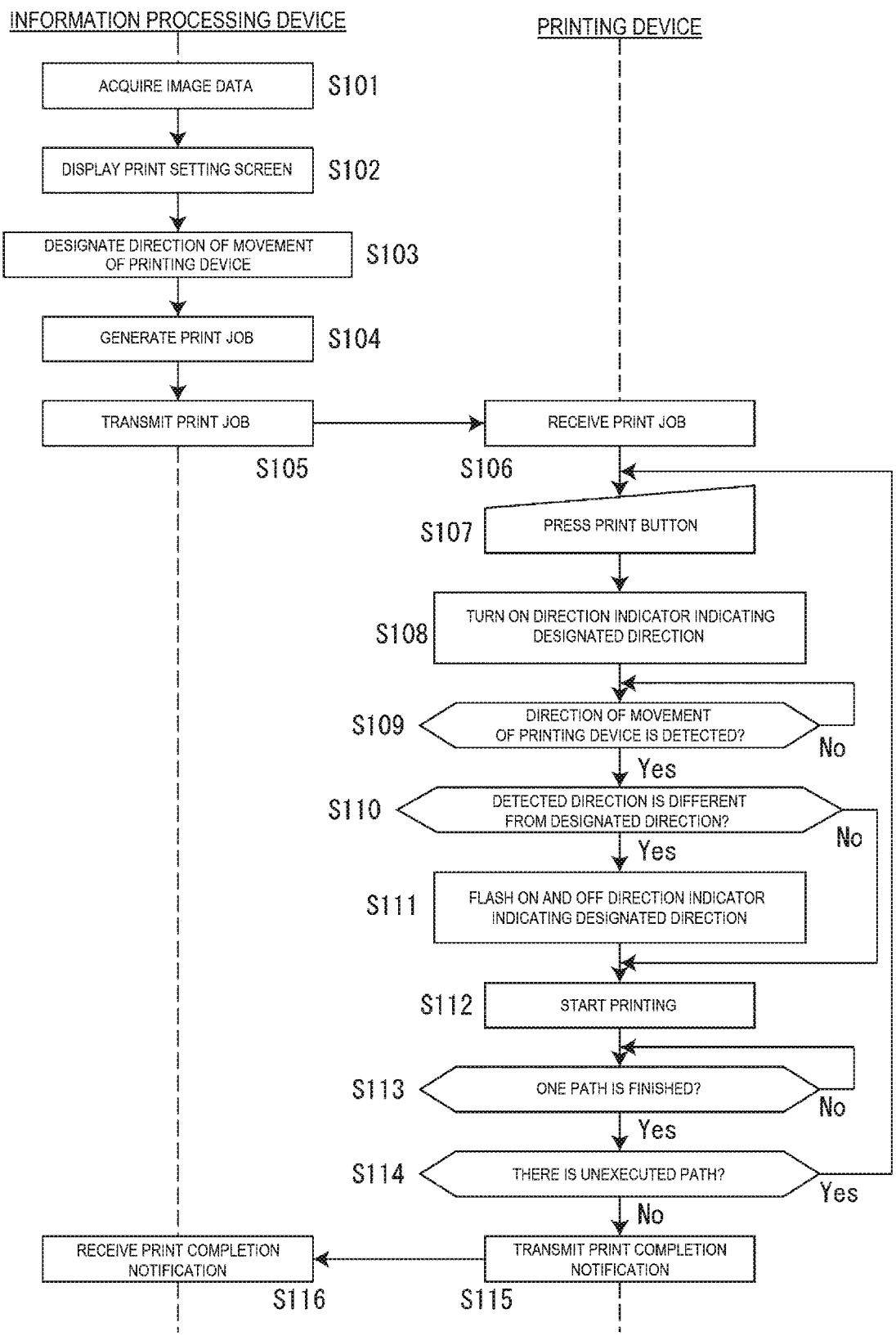
FIG. 16 is a flowchart showing printing control processing executed by the information processing device and printing processing executed by the printing device in the first embodiment.

The printing control processing executed by the information processing device 1 and the printing processing executed by the printing device 101 in the first embodiment will now be described with reference to FIG. 16.

In step S101, the information processing device 1 acquires image data via the image data acquisition unit 15.

In step S102, the information processing device 1 displays the print setting screen 27 at the processing-side display unit 11 via the display control unit 17.

In step S103, the information processing device 1 designates a direction of movement of the printing device 101 for each path via the movement direction designation unit 19, based on the result of selection of a movement direction mode on the print setting screen 27.

In step S104, the information processing device 1 generates a print job via the job generation unit 21, based on the image data and the designated direction for each path.

In step S105, the information processing device 1 transmits the print job to the printing device 101 via the job transmission unit 23.

In step S106, the printing device 101 receives the print job transmitted from the information processing device 1, via the job acquisition unit 135.

When the print button 115 is pressed by the user 301 in step S107, the printing device 101 proceeds to step S108.

In step S108, the printing device 101 causes the direction notification indicator 118 indicating the designated direction, of the two direction notification indicators 118, to turn on, as non-error notification processing via the notification control unit 141.

In step S109, the printing device 101 determines via the direction determination unit 139 whether the direction of movement of the printing device 101 is detected by the detection unit 137 or not. When it is determined that the direction of movement of the printing device 101 is not detected, the printing device 101 repeats step S109 until it is determined that the direction of movement of the printing device 101 is detected.

Meanwhile, when it is determined in step S109 that the direction of movement of the printing device 101 is detected, the printing device 101 proceeds to step S110.

In step S110, the printing device 101 determines via the direction determination unit 139 whether the detected direction is different from the designated direction or not. When it is determined that the detected direction is different from the designated direction, the printing device 101 proceeds to step S111.

In step S111, the printing device 101 switches via the notification control unit 141 the direction notification indicator 118 indicating the designated direction, of the two direction notification indicators 118, from the on-state to the state of flashing on and off. After executing step S111, the printing device 101 returns to step S109.

Meanwhile, when it is determined in step S110 that the detected direction is not different from the designated direction, that is, that the detected direction is the same as the designated direction, the printing device 101 proceeds to step S112.

In step S112, the printing device 101 controls the print head 121 via the head control unit 143 in such a way that the print head 121 starts printing based on print data included in the print job.

In step S113, the printing device 101 determines whether one path is finished or not, via the path determination unit 145. When it is determined that one path is not finished, the printing device 101 repeats step S113 until it is determined that one path is finished.

Meanwhile, when it is determined in step S113 that one path is finished, the printing device 101 proceeds to step S114.

In step S114, the printing device 101 determines whether there is an unexecuted path or not, via the path determination unit 145. When it is determined that there is an unexecuted path, the printing device 101 returns to step S107. For example, when the print job is performed in two paths, as shown in FIGS. 7 and 8, the printing device 101 repeatedly performs steps S107 to S114 twice.

Meanwhile, when it is determined in step S114 that there is no unexecuted path, the printing device 101 proceeds to step S115.

In step S115, the printing device 101 transmits a print completion notification to the information processing device 1 via the completion notification transmission unit 147.

In step S116, the information processing device 1 receives the print completion notification via the completion notification reception unit 25.

Specific Example of Printing Processing in First Embodiment

A specific example of the printing processing executed by the printing device 101 in the first embodiment will now be described with reference to FIGS. 17 to 21. In this example, it is assumed that the printing device 101 prints a letter string "ABCDEFG" in the first path and prints a letter string "1234567" in the second path. It is also assumed that the one-direction mode is selected at the information processing device 1.

Figure 17:
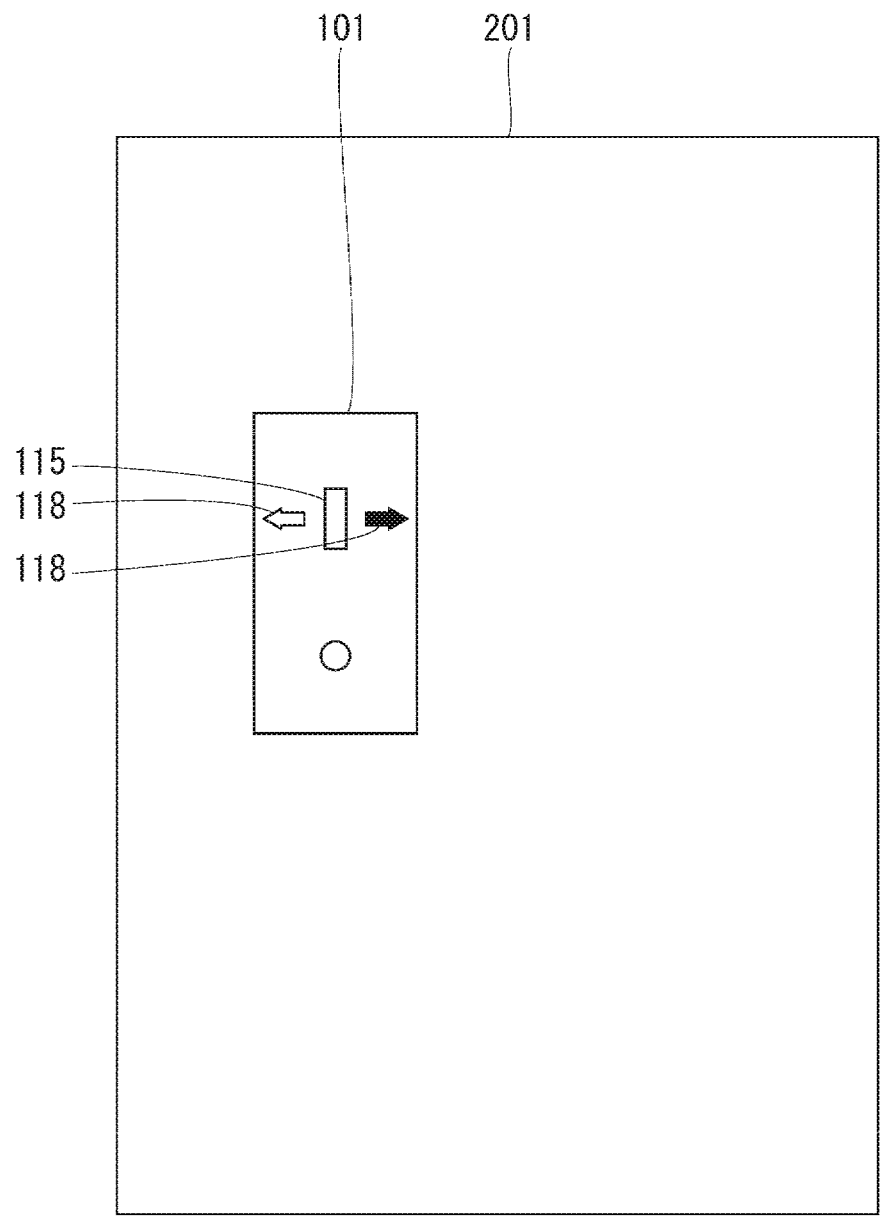
FIG. 17 shows an example of the printing processing executed by the printing device in the first embodiment.
Figure 17:
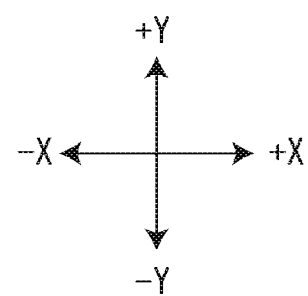

When the user 301 presses the print button 115 to execute the first path, the direction notification indicator 118 indicating the designated direction for the first path, that is, the direction notification indicator 118 provided in the +X direction in relation to the print button 115, of the two direction notification indicators 118, turns on, as shown in FIG. 17.

Figure 18:
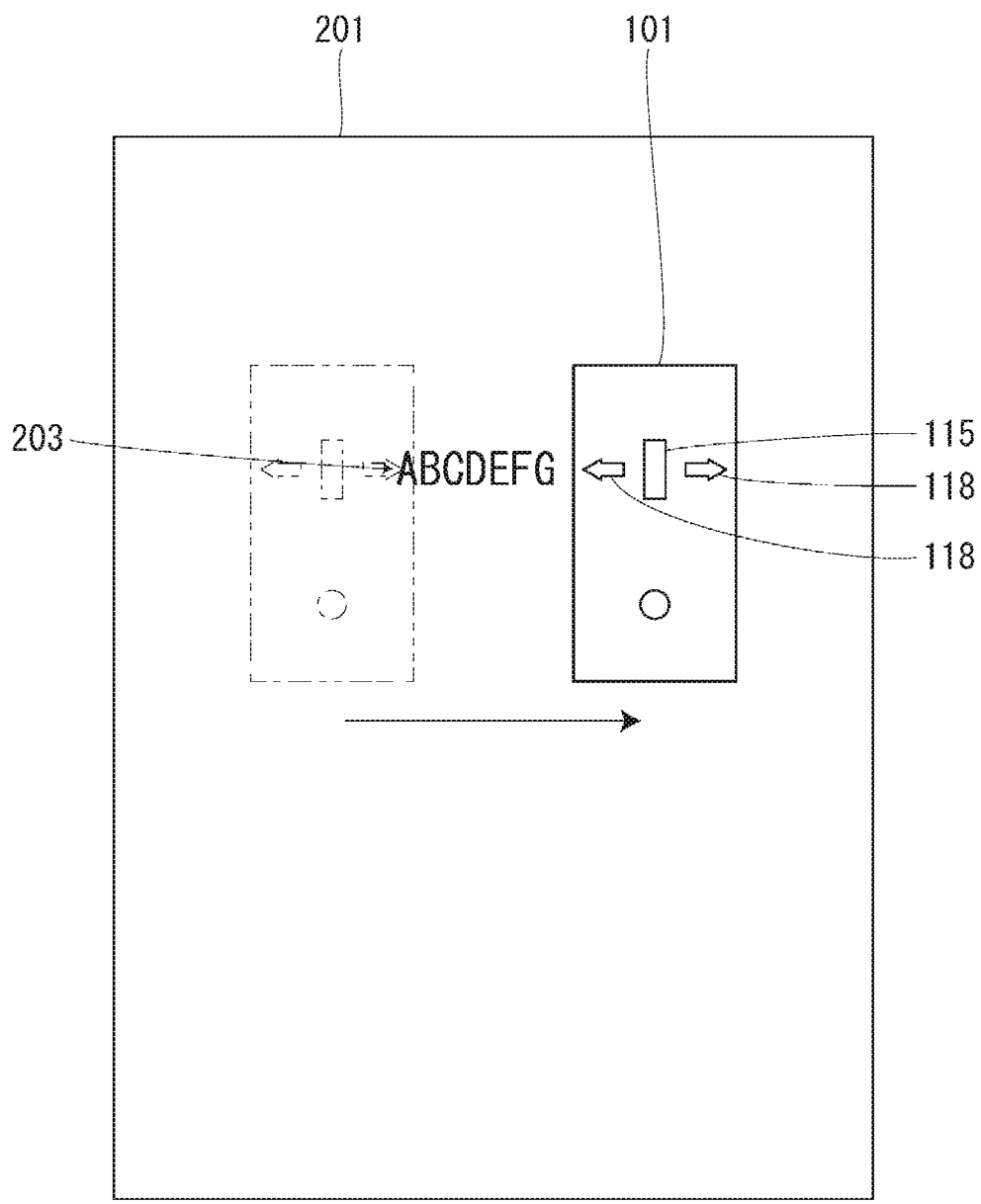
FIG. 18 shows an example of the printing processing executed by the printing device in the first embodiment, continued from FIG. 17.
Figure 18:
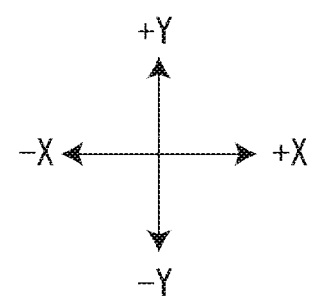

Then, as the user 301 moves the printing device 101 in the +X direction, the letter string "ABCDEFG" is printed, as shown in FIG. 18. When printing in each path is finished, the direction notification indicator 118 turns off.

Figure 19:
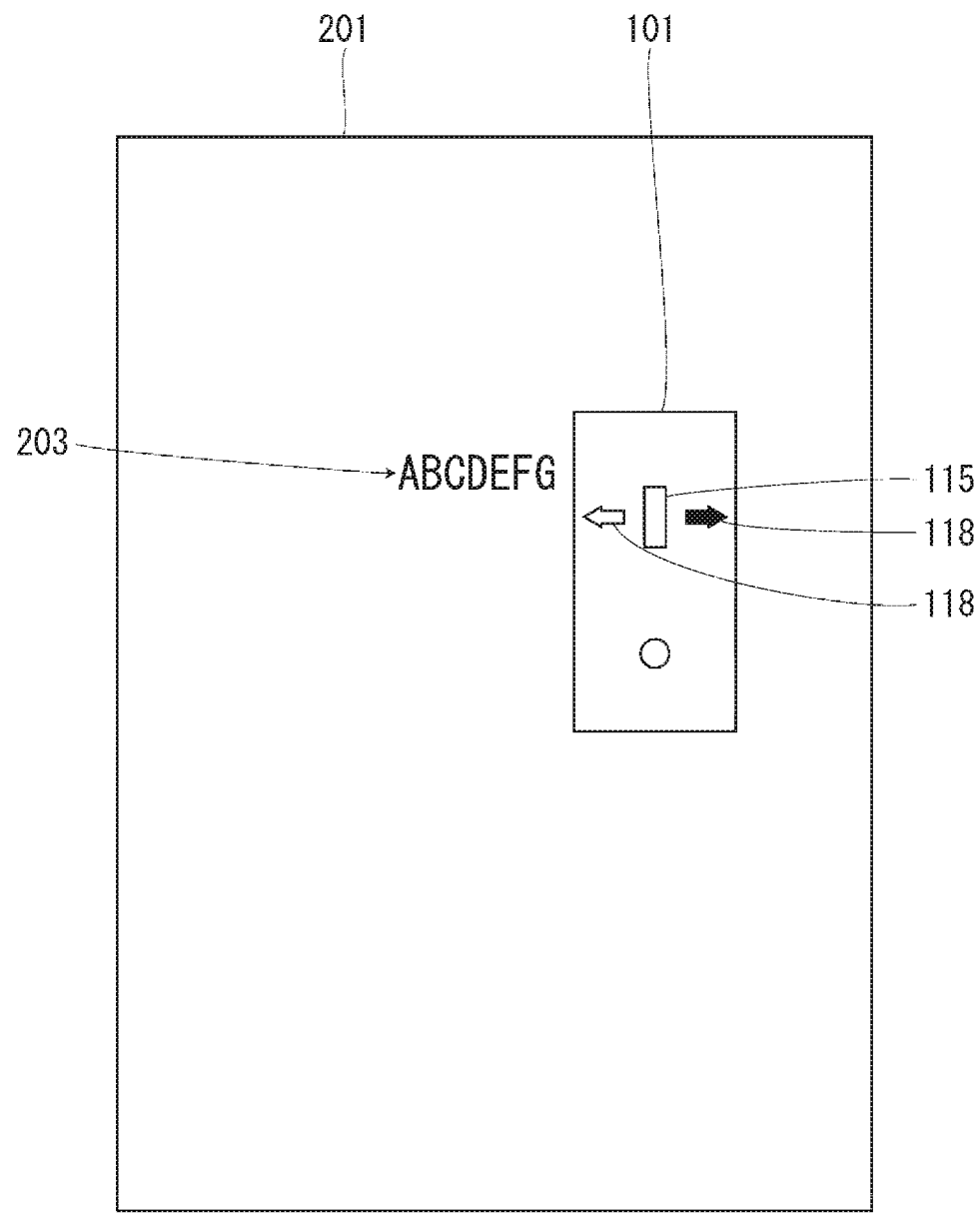
FIG. 19 shows an example of the printing processing executed by the printing device in the first embodiment, continued from FIG. 18.
Figure 19:
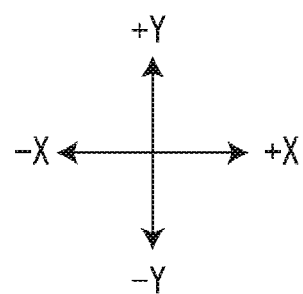

Subsequently, when the user 301 presses the print button 115 to execute the second path, the direction notification indicator 118 indicating the designated direction for the second path, that is, the direction notification indicator 118 provided in the +X direction in relation to the print button 115, of the two direction notification indicators 118, turns on, as shown in FIG. 19.

Figure 20:
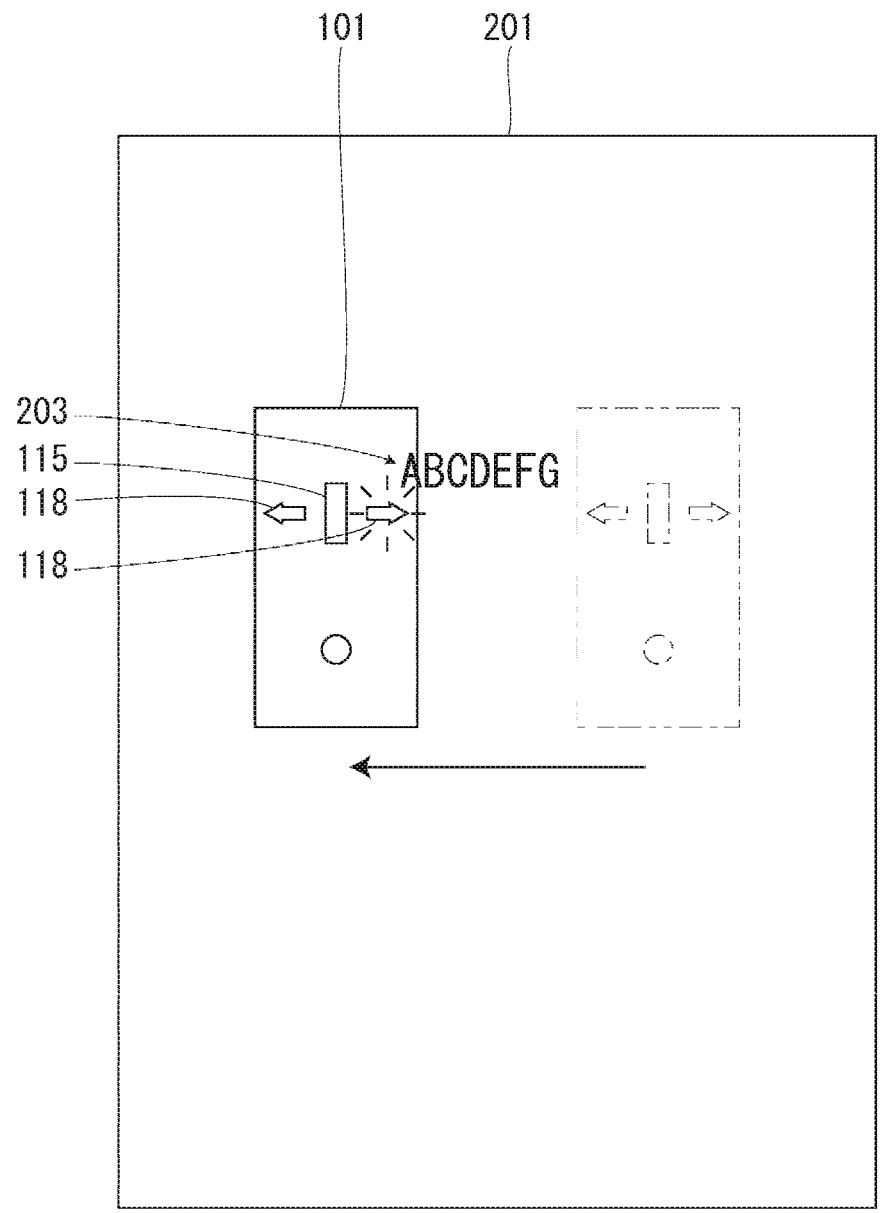
FIG. 20 shows an example of the printing processing executed by the printing device in the first embodiment, continued from FIG. 19.
Figure 20:
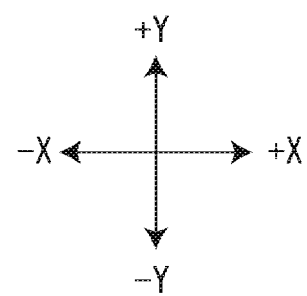

Then, when the user 301 moves the printing device 101 in the −X direction by mistake while the printing device 101 should be moved in the +X direction, the letter string "1234567" is not printed and the direction notification indicator 118 indicating the designated direction for the second path, that is, the direction notification indicator 118 provided in the +X direction in relation to the print button 115, flashes on and off, as shown in FIG. 20.

Figure 21:
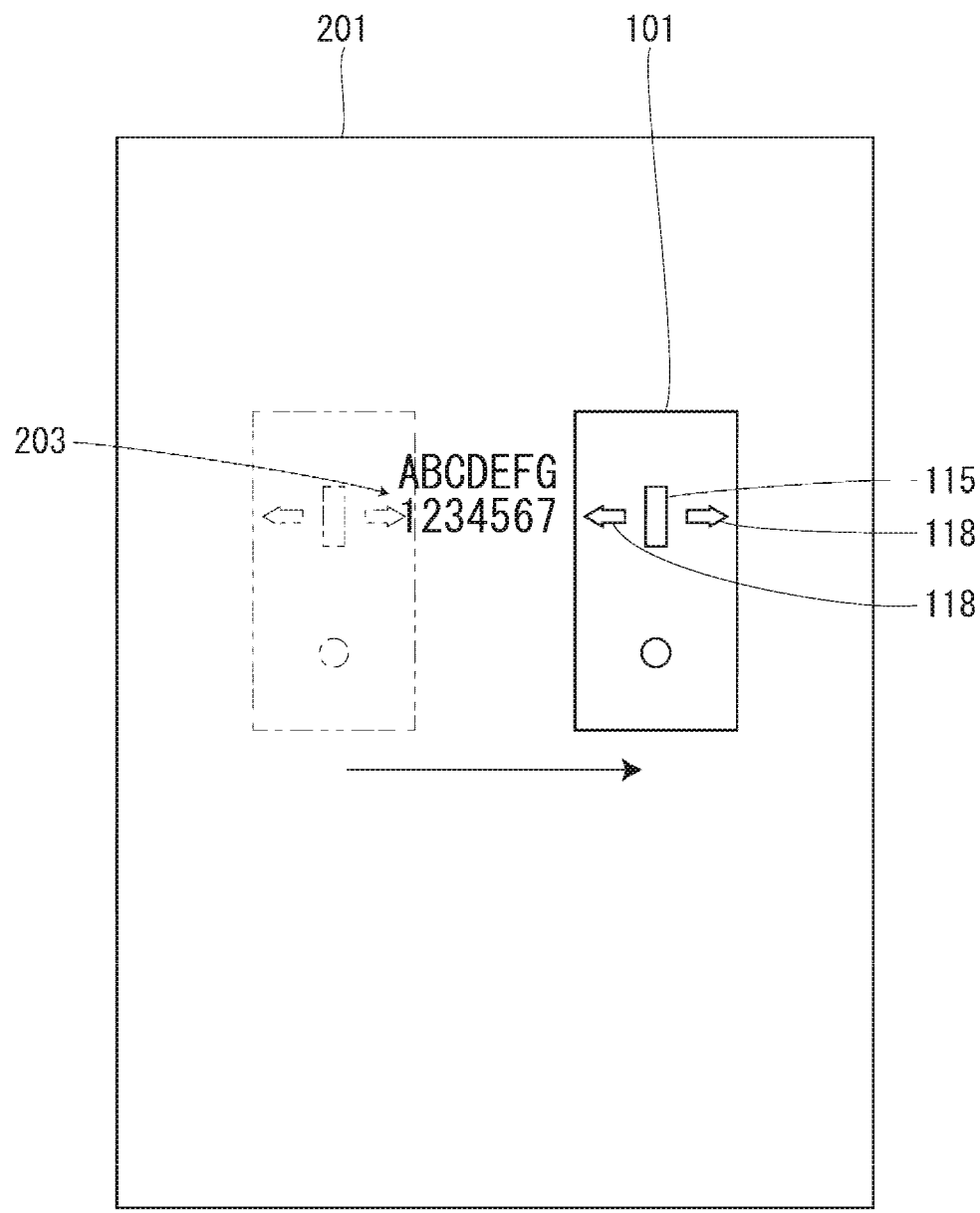
FIG. 21 shows an example of the printing processing executed by the printing device in the first embodiment, continued from FIG. 20.

As the user 301 notices that the direction of movement of the printing device 101 is wrong, and moves the printing device 101 in the direction indicated by the direction notification indicator 118 that is flashing on and off, that is, in the +X direction, the letter string "1234567" is printed, as shown in FIG. 21. When the printing device 101 is moved in the direction indicated by the direction notification indicator 118, the direction notification indicator 118 switches from the state of flashing on and off to the on-state. The direction notification indicator 118 turns off after the printing is finished.

As described above, when the printing device 101 in the first embodiment causes the direction notification indicator 118 indicating the designated direction to flash on and off, as error notification processing, when the printing device 101 is moved in a different direction from the designated direction. Therefore, the user 301 can be notified that the printing device 101 has been moved in a different direction from the designated direction, and the user 301 can be guided to move the printing device 101 in the designated direction.

Also, the printing device 101 in the first embodiment starts printing based on the print job when the printing device 101 is moved in the designated direction after causing the direction notification indicator 118 to flash on and off as error notification processing. Therefore, the printing device 101 can properly print the print image 203. In other words, even when the user 301 has moved the printing device 101 in a different direction from the designated direction, the user 301 can change the direction of movement of the printing device 101 to the direction indicated by the direction notification indicator 118 that is flashing on and off, and thus can cause the printing device 101 to properly print the print image 203. Also, when the user 301 moves the printing device 101 in the wrong direction from the second path onward, the printing is resumed from the path in question and therefore there is no need to carry out the printing again from the first path.

Second Embodiment

In a second embodiment, when the detected direction is different from the designated direction, the printing device 101 transmits an error signal, described later, to the information processing device 1 and thus notifies the information processing device 1 of the error, as error notification processing.

Functional Configuration of Information Processing Device in Second Embodiment

Figure 22:
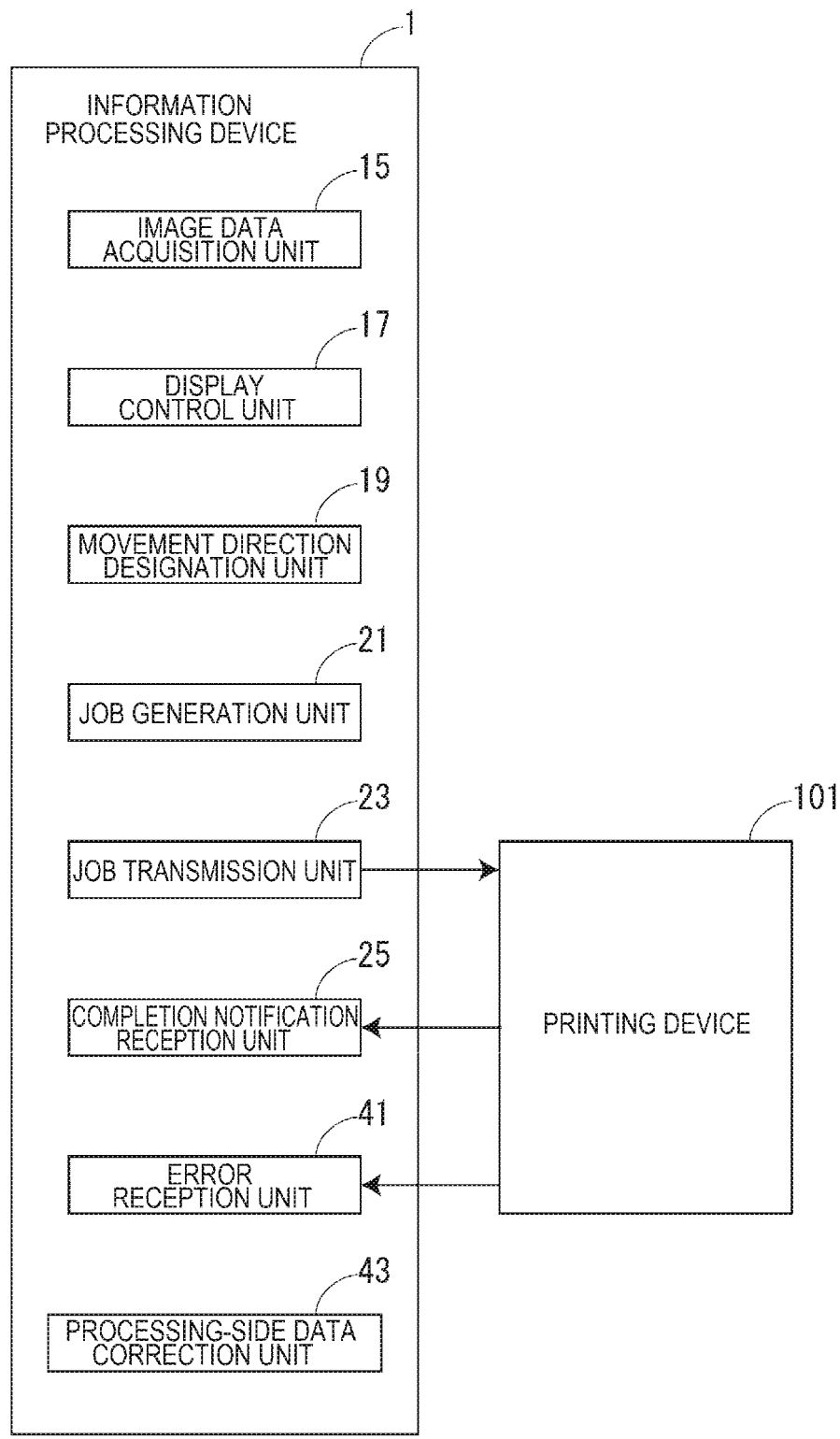
FIG. 22 is a block diagram showing the functional configuration of the information processing device in a second embodiment.

The functional configuration of the information processing device 1 in the second embodiment will now be described with reference to FIG. 22. The information processing device 1 in the second embodiment is different from the information processing device 1 in the first embodiment in having an error reception unit 41 and a processing-side data correction unit 43 in addition to the configuration of the information processing device 1 in the first embodiment.

The error reception unit 41 receives an error signal transmitted from the printing device 101. The error signal includes path information and detected direction information. The path information is information representing which path is the path for which the detected direction is determined as being different from the designated direction, from among a plurality of paths included in the print job. The detected direction information is information representing the detected direction for the path for which the detected direction is determined as being different from the designated direction. For example, when the printing device 101 is moved in the −X direction while the designated direction for the first path is the +X direction, the error signal includes path information representing the first path and detected direction information representing the −X direction.

The processing-side data correction unit 43 corrects print data included in the print job, based on the error signal received by the error reception unit 41. That is, the processing-side data correction unit 43 changes the designated direction for the path having the ordinal number indicated by the path information included in the error signal, to the same direction as the detected direction represented by the detected direction information included in the error signal. The processing-side data correction unit 43 also corrects print data corresponding to the path having the ordinal number indicated by the path information included in the error signal, of the print data included in the print job, so as to correspond to the changed designated direction. For example, when the error signal includes path information representing the first path and detected direction information representing the −X direction, the processing-side data correction unit 43 corrects print data corresponding to the first path, of the print data included in the print job, so as to correspond to the −X direction, which is the changed designated direction. The print job, after being generated by the job generation unit 21, is stored in the processing-side memory 5, for example, until the completion notification reception unit 25 receives a print completion notification.

Functional Configuration of Printing Device in Second Embodiment

Figure 23:
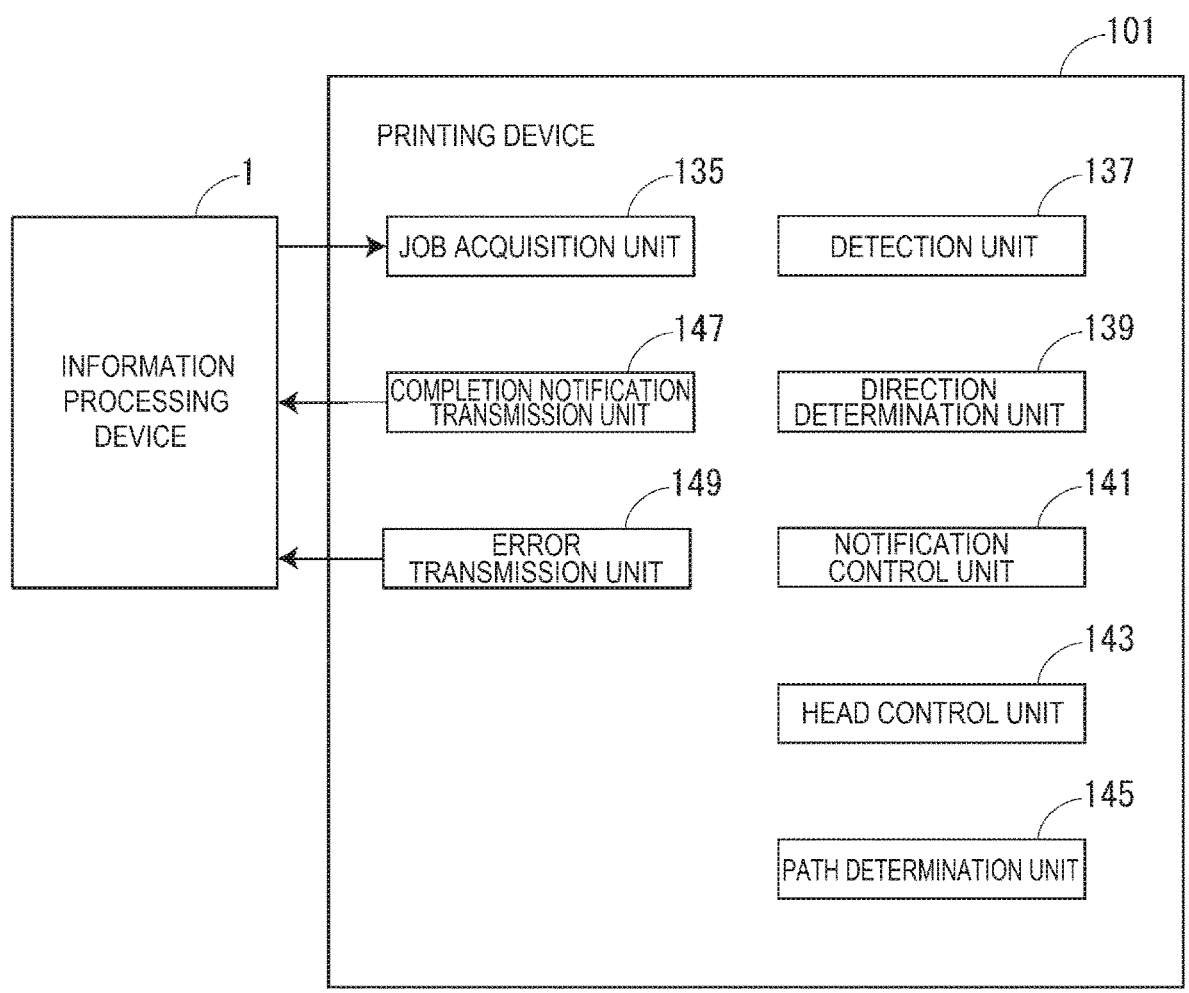
FIG. 23 is a block diagram showing the functional configuration of the printing device in the second embodiment.

The functional configuration of the printing device 101 in the second embodiment will now be described with reference to FIG. 23. The printing device 101 in the second embodiment is different from the printing device 101 in the first embodiment in having an error transmission unit 149 in addition to the configuration of the printing device 101 in the first embodiment.

The error transmission unit 149 transmits an error signal to the information processing device 1 as error notification processing when the direction determination unit 139 determines that the detected direction is different from the designated direction. That is, the error transmission unit 149 functions as the "error processing unit" performing error notification processing.

Printing Control Processing and Printing Processing in Second Embodiment

Figure 24:
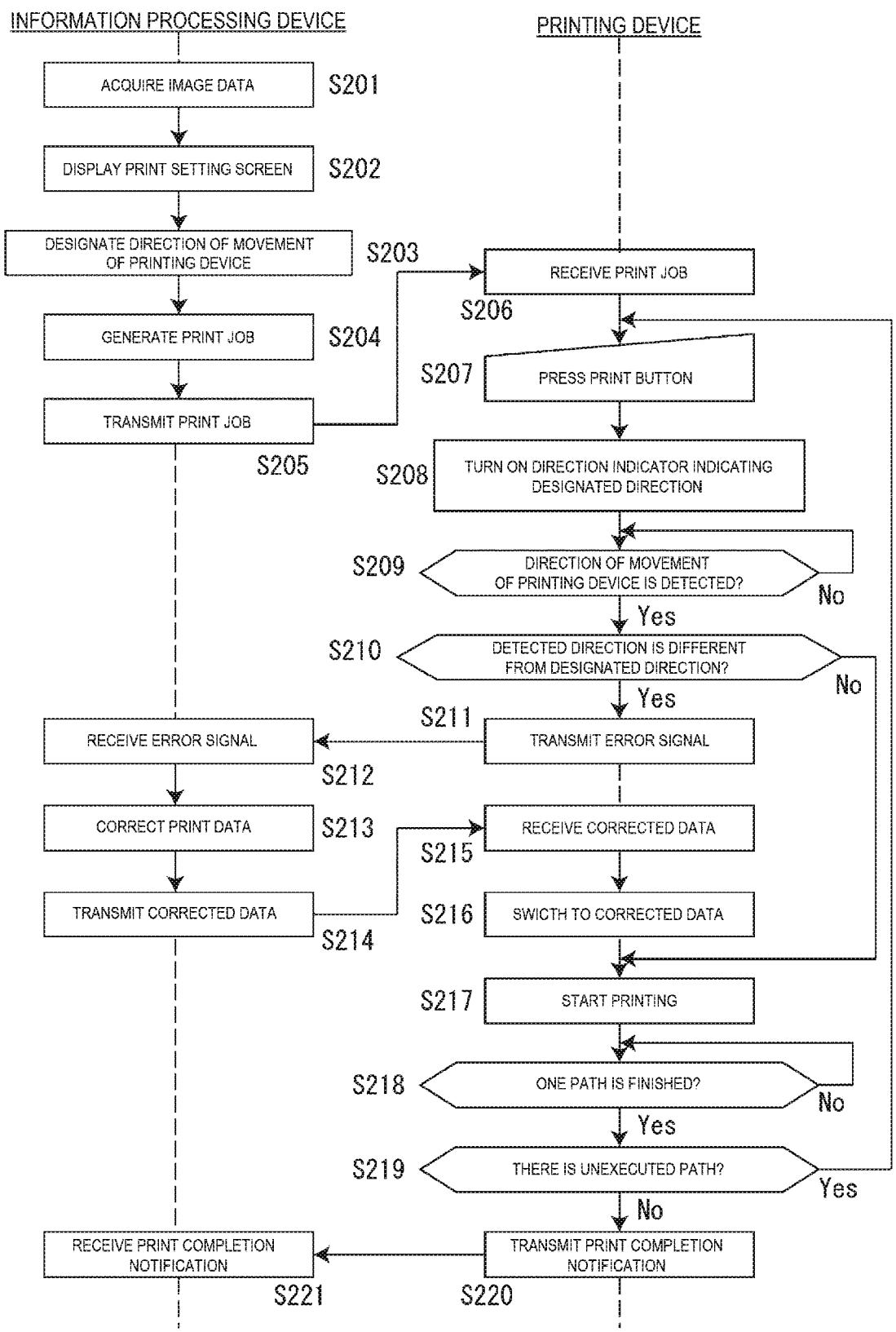
FIG. 24 is a flowchart showing printing control processing executed by the information processing device and printing processing executed by the printing device in the second embodiment.

The printing control processing executed by the information processing device 1 and the printing processing executed by the printing device 101 in the second embodiment will now be described with reference to FIG. 24.

The information processing device 1 executes steps S201 to S205 similarly to steps S101 to S105. The printing device 101 executes steps S206 to S210 similarly to steps S106 to S110. When it is determined in step S210 that the detected direction is different from the designated direction, the printing device 101 proceeds to step S211.

In step S211, the printing device 101 transmits an error signal to the information processing device 1 via the error transmission unit 149, as error notification processing.

In step S212, the information processing device 1 receives the error signal transmitted from the printing device 101, via the error reception unit 41.

In step S213, the information processing device 1 corrects print data, based on the received error signal, via the processing-side data correction unit 43.

In step S214, the information processing device 1 transmits the corrected data, that is, the corrected print data, to the printing device 101 via the job transmission unit 23.

In step S215, the printing device 101 receives the corrected data transmitted from the information processing device 1, via the job acquisition unit 135.

In step S216, the printing device 101 switches the print data included in the print job to the corrected data. That is, the printing device 101 switches the print data corresponding to the path having the ordinal number for which the detected direction is determined as being different from the designated direction, of the print data included in the print job received in step S206, to the corrected data received in step S215.

The printing device 101 executes steps S217 to S220 similarly to steps S112 to S115. When the printing device 101 in step S216 switches the print data included in the print job to the corrected data, the printing device 101 in step S217 controls the print head 121 via the head control unit 143 in such a way that the print head 121 starts printing based on the corrected data.

The information processing device 1 executes step S221 similarly to step S116.

Specific Example of Printing Processing in Second Embodiment

A specific example of the printing processing executed by the printing device 101 in the second embodiment will now be described with reference to FIGS. 25 and 26. In this example, it is assumed that the printing device 101 performs only one path and prints a letter string "ABCDEFG".

Figure 25:
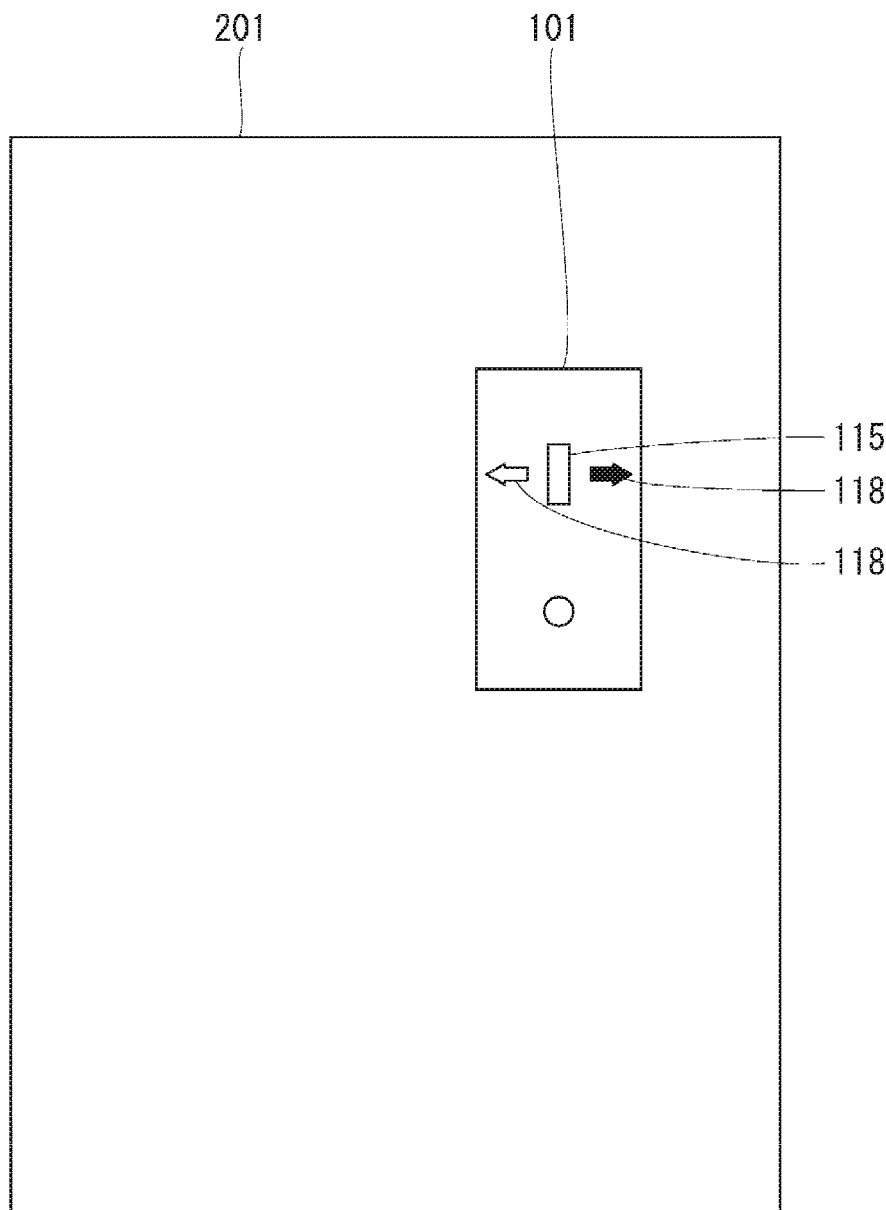
FIG. 25 shows an example of the printing processing executed by the printing device in the second embodiment.
Figure 25:
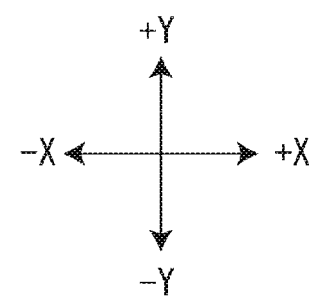

When the user 301 presses the print button 115 to execute the path, the direction notification indicator 118 indicating the designated direction, that is, the direction notification indicator 118 provided in the +X direction in relation to the print button 115, of the two direction notification indicators 118, turns on, as shown in FIG. 25.

Figure 26:
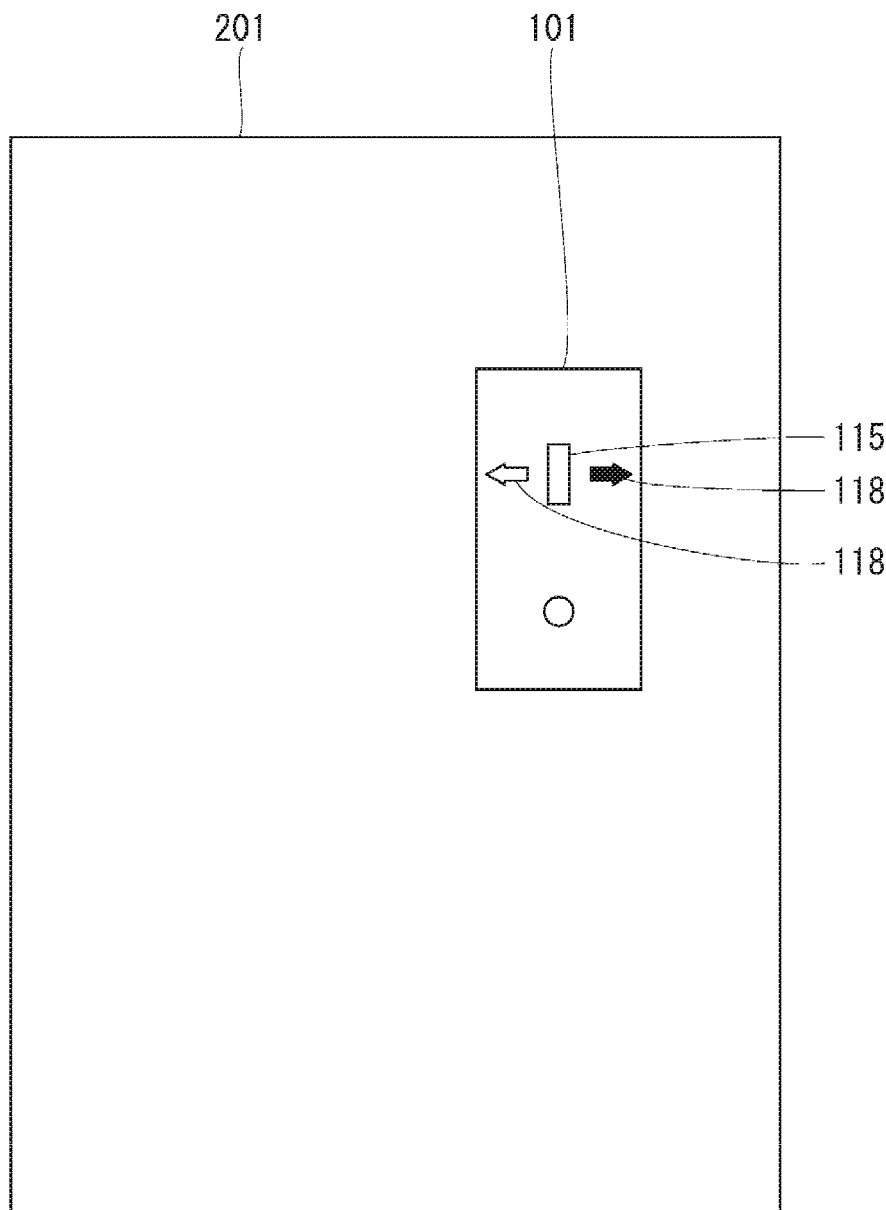
FIG. 26 shows an example of the printing processing executed by the printing device in the second embodiment, continued from FIG. 25.
Figure 26:
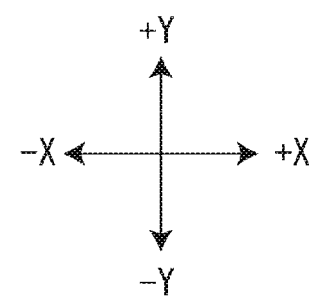

Then, when the user 301 moves the printing device 101 in the −X direction by mistake while the printing device 101 should be moved in the +X direction, the print data is corrected and the letter string "ABCDEFG" is printed, as shown in FIG. 26. After the print data is corrected and before the printing starts, a change of state takes place from the state where the direction notification indicator 118 provided in the +X direction in relation to the print button 115 is on to the state where the direction notification indicator 118 provided in the −X direction in relation to the print button 115 is on. That is, a change of state takes place from the state where the direction notification indicator 118 indicating the designated direction before the change is on to the state where the direction notification indicator 118 indicating the direction in which the printing device 101 is moved is on.

As described above, the printing device 101 in the second embodiment transmits an error signal to the information processing device 1 as error notification processing when the printing device 101 is moved in a different direction from the designated direction. The printing device 101 performs printing, based on print data corrected by the information processing device 1 based on the error signal. Therefore, the printing device 101 can properly print the print image 203 even when moved in a different direction from the direction of movement designated by the print job. That is, even when the user 301 has moved the printing device 101 in a different direction from the designated direction, the user 301 need not change the direction of movement of the printing device 101 and can cause the printing device 101 to properly print the print image 203 by moving the printing device 101 in the unchanged direction that is different from the designated direction.

Third Embodiment

In a third embodiment, when the detected direction is different from the designated direction, the printing device 101 itself corrects the print data.

Functional Configuration of Printing Device in Third Embodiment

Figure 27:
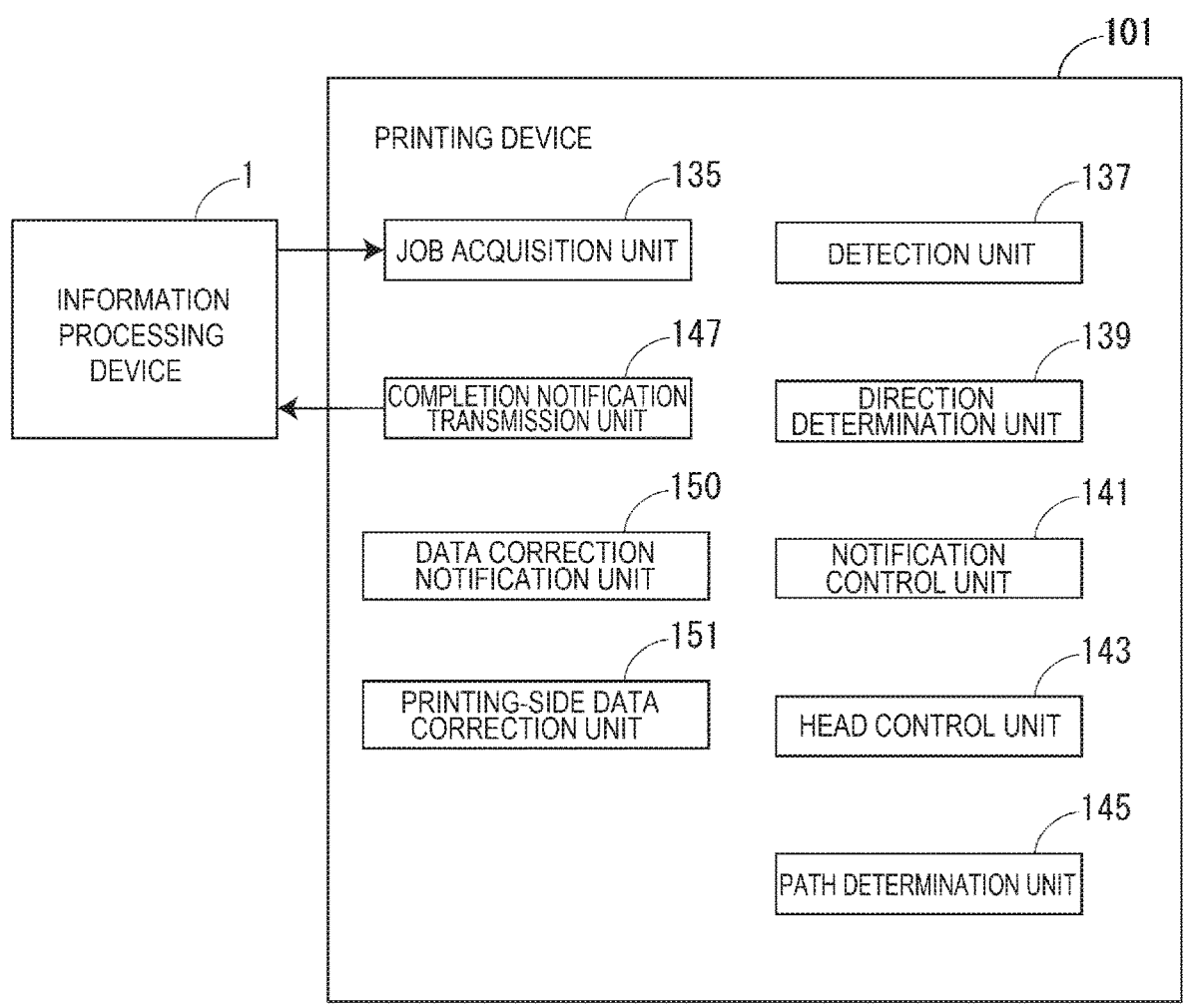
FIG. 27 is a block diagram showing the functional configuration of the printing device in a third embodiment.

The functional configuration of the printing device 101 in the third embodiment will now be described with reference to FIG. 27. The information processing device 1 in the third embodiment has functional units similar to those in the information processing device 1 in the first embodiment and therefore will not be described further.

The printing device 101 in the third embodiment is different from the printing device 101 in the first embodiment in having a data correction notification unit 150 and a printing-side data correction unit 151 in addition to the configuration of the printing device 101 in the first embodiment.

The data correction notification unit 150 gives an error notification to the printing-side data correction unit 151 when the direction determination unit 139 determines that the detected direction is different from the designated direction. That is, the data correction notification unit 150 functions as the "error processing unit" performing error notification processing. In response to the error notification from the data correction notification unit 150, the printing-side data correction unit 151 corrects the print data so as to correspond to the detected direction. That is, the printing-side data correction unit 151 changes the designated direction for the path having the ordinal number for which the detected direction is determined as being different from the designated direction, to the same direction as the detected direction. The printing-side data correction unit 151 also corrects print data corresponding to the path having the ordinal number for which the detected direction is determined as being different from the designated direction, of the print data included in the print job, so as to correspond to the detected direction, that is, the changed designated direction. For example, when the detected direction is the −X direction, the printing-side data correction unit 151 corrects print data corresponding to the first path, of the print data included in the print job, so as to correspond to the −X direction, which is the changed designated direction.

Printing Control Processing and Printing Processing in Third Embodiment

Figure 28:
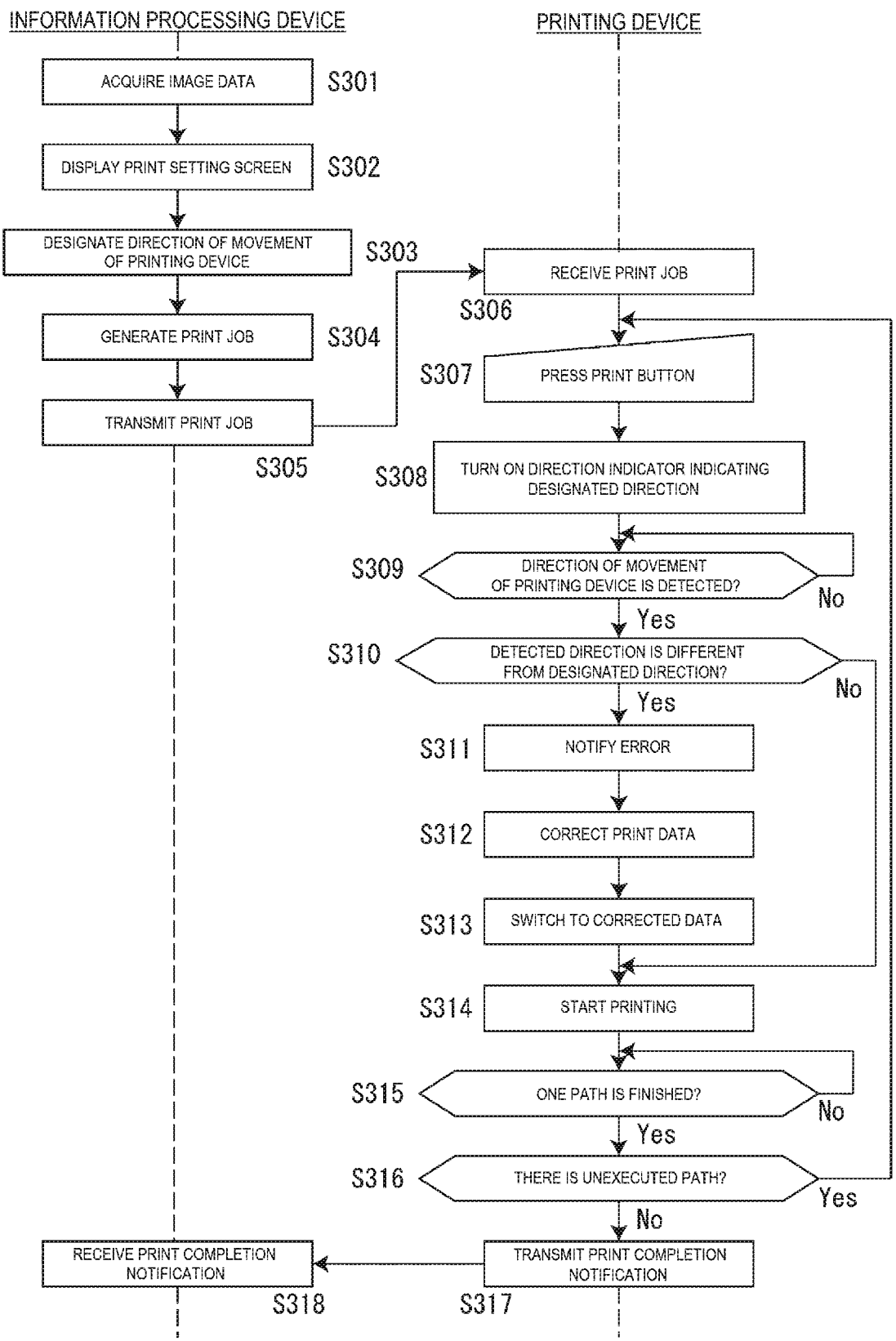
FIG. 28 is a flowchart showing printing control processing executed by the information processing device and printing processing executed by the printing device in the third embodiment.

The printing control processing executed by the information processing device 1 and the printing processing executed by the printing device 101 in the third embodiment will now be described with reference to FIG. 28.

The information processing device 1 executes steps S301 to S305 similarly to steps S201 to S205. The printing device 101 executes steps S306 to S310 similarly to steps S206 to S210. When it is determined in step S310 that the detected direction is different from the designated direction, the printing device 101 proceeds to step S311.

In step S311, the data correction notification unit 150 of the printing device 101 gives an error notification to the printing-side data correction unit 151. In step S312, in response to the error notification from the data correction notification unit 150, the printing-side data correction unit 151 of the printing device 101 corrects the print data so as to correspond to the detected direction.

The printing device 101 executes steps S313 to S317 similarly to steps S216 to S220. When the printing device 101 in step S312 corrects the print data, the printing device 101 in step S314 controls the print head 121 via the head control unit 143 in such a way that the print head 121 starts printing based on the corrected data.

The information processing device 1 executes step S318 similarly to step S221.

As a specific example of the printing processing executed by the printing device 101 in the third embodiment, the specific example of the printing processing executed by the printing device 101 in the second embodiment shown in FIGS. 25 and 26 is similarly applied. Therefore, this specific example will not be described further here.

As described above, in the printing device 101 in the third embodiment, the printing-side data correction unit 151 is given an error notification, and on receiving the error notification, the printing-side data correction unit 151 corrects the print data, based on the detected direction, as error notification processing when the printing device 101 is moved in a different direction from the designated direction. Therefore, the printing device 101 can properly print the print image 203 even when moved in a different direction from the direction of movement designated by the print job. That is, even when the user 301 has moved the printing device 101 in a different direction from the designated direction, the user 301 need not change the direction of movement of the printing device 101 and can cause the printing device 101 to properly print the print image 203 by moving the printing device 101 in the unchanged direction that is different from the designated direction.

Other Modification Examples

The present disclosure is not limited to the above embodiments and can employ various configurations without departing from the spirit and scope of the present disclosure. The embodiments can be changed to configurations as described below, as well as those described above.

In the first embodiment, the method for the notification control unit 141 to control the direction notification indicator 118 in such a way that the direction notification indicator 118 notifies the designated direction in different forms between error notification processing and non-error notification processing is not particularly limited. For example, the notification control unit 141 may cause the direction notification indicator 118 indicating the designated direction to flash on and off in non-error notification processing and may cause the direction notification indicator 118 indicating the designated direction to turn on in error notification processing, as opposed to the first embodiment. The notification control unit 141 may also cause the direction notification indicator 118 indicating the designated direction to turn on or flash on and off, in different colors between error notification processing and non-error notification processing.

In the first embodiment, the notification control unit 141 is not limited to being configured to notify the user 301 that the printing device 101 has been moved in a different direction from the designated direction and also notify the user 301 of the designated direction, as error notification processing. The notification control unit 141 may be configured to notify the user 301 only that the printing device 101 has been moved in a different direction from the designated direction. In this case, the notification control unit 141 may cause, for example, a different lamp from the direction notification indicator 118 to turn on or flash on and off.

Figure 29:
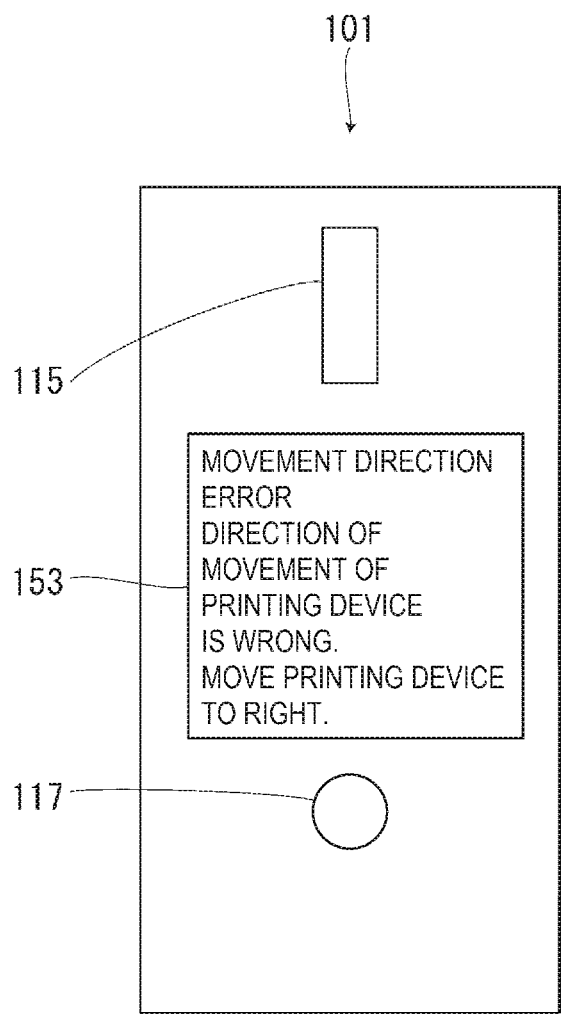
FIG. 29 shows a printing device having a display.
Figure 29:
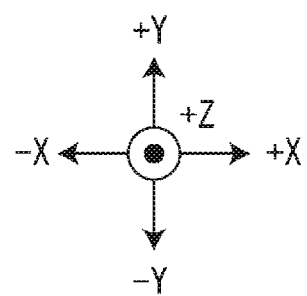

In the first embodiment, the direction notification indicator 118 is used as the "notification unit". However, this is not limiting. For example, a display 153 may be used, as shown in FIG. 29. In this case, as error notification processing, the notification control unit 141 may cause the display 153 to display a message showing that the printing device 101 has been moved in a different direction from the designated direction, such as "Movement direction error" and "Direction of movement of printing device is wrong" as shown in FIG. 29. As error notification processing, the notification control unit 141 may also cause the display 153 to display a message showing the designated direction, such as "Move printing device to right" as shown in FIG. 29. The display 153 may be located at a position corresponding to the print head 121 in the Y-direction, similarly to the direction notification indicator 118. Also, the information processing device 1 may be configured to cause the processing-side display unit 11 to display a similar message, based on an error notification transmitted from the printing device 101. The "notification unit" may also be configured to notify the user 301 by a sound or vibration.

In the first to third embodiments, the notification control unit 141 is not limited to being configured to cause the direction notification indicator 118 indicating the designated direction to turn on as non-error notification processing. The notification control unit 141 may be configured not to perform non-error notification processing. That is, the notification control unit 141 may keep the direction notification indicator 118 indicating the designated direction, in the off-state, until it is determined that the detected direction is different from the designated direction after the print button 115 is pressed.

In the first to third embodiments, the job acquisition unit 135 is not limited to being configured to acquire a print job from the information processing device 1. For example, the job acquisition unit 135 may be configured to acquire a print job generated by the printing device 101 itself, based on image data acquired from a flash memory or the like. The job acquisition unit 135 is not limited to being configured to acquire, at a time, a plurality of print data corresponding to a plurality of paths. The job acquisition unit 135 may be configured to acquire print data for each path. For example, the job acquisition unit 135 may acquire print data every time the print button 115 is pressed.

The print head 121 is not limited to an inkjet head and may be, for example, a thermal head performing thermal transfer printing.

The printing device 101 may be configured to notify the user 301 of the designated direction via the notification unit such as the direction notification indicator 118 or the display 153 before the user 301 starts moving the printing device 101, instead of performing error notification processing as described in the first to third embodiments.

Supplementary Notes

Supplementary notes on the printing device and the control method for the printing device are given below.

A printing device printing on a medium while being manually moved in relation to the medium is provided. The printing device includes: a job acquisition unit acquiring a print job designating a direction of movement of the printing device as viewed from the printing device; a print head printing on the medium, based on the print job, while the printing device is moved; a detection unit detecting a direction of movement of the printing device as viewed from the printing device while the printing device is moved; a direction determination unit determining whether or not a detected direction, which is the direction of movement of the printing device detected by the detection device, is different from a designated direction, which is the direction of movement of the printing device designated by the print job; and an error processing unit performing error notification processing when the direction determination unit determines that the detected direction is different from the designated direction.

In this configuration, error notification processing is performed when the printing device is moved in a different direction from the designated direction. Therefore, the printing device is restrained from printing a print image inappropriately.

In this case, the printing device may have a notification unit notifying a user, and a notification control unit functioning as the error processing unit. The notification control unit may control the notification unit in such away that the notification unit notifies the user that the printing device is moved in a different direction from the designated direction, as the error notification processing.

This configuration can make the user aware that the printing device has been moved in a different direction from the designated direction, when the printing device has been moved in a different direction from the designated direction.

The direction notification indicator 118 is an example of the "notification unit". Also, the display 153 is an example of the "notification unit".

In this case, the printing device may have a head control unit controlling the print head. The head control unit may control the print head in such a way that the print head starts printing based on the print job when the direction determination unit determines that the detected direction detected after the notification unit gives a notification is the same as the designated direction.

In this configuration, printing based on the print job is started when the printing device is moved in the designated direction after the notification unit gives a notification as error notification processing. Therefore, the printing device can properly print a print image.

In this case, the notification control unit may control the notification unit in such a way that the notification unit notifies the user of the designated direction, as the error notification processing.

This configuration can guide the user to move the printing device in the designated direction when the printing device is moved in a different direction from the designated direction.

In this case, the notification control unit may control the notification unit in such a way that the notification unit notifies the user of the designated direction as non-error notification processing before the printing device starts to be moved.

This configuration can guide the user in advance to move the printing device in the designated direction, before the printing device is moved.

In this case, the notification control unit may control the notification unit in such a way that the notification unit notifies the user of the designated direction in different forms between the error notification processing and the non-error notification processing.

This configuration can make the user recognize whether the notification by the notification unit is a notification based on non-error notification processing or a notification based on error notification processing.

In this case, the notification unit may be provided at an opposite surface that is an outer surface opposite to an outer surface where the print head is provided, of a plurality of outer surfaces of the printing device, and may be located at a position corresponding to the print head in a second direction orthogonal to the designated direction within the opposite surface.

In this configuration, the notification unit can indicate the position where the print head is provided, to the user.

The first outer surface 103 is an example of the "opposite surface". The Y-direction is an example of the "second direction".

In this case, the job acquisition unit may acquire the print job from an external device. The printing device may have an error transmission unit functioning as the error processing unit. The error transmission unit may transmit an error signal to the external device, as the error notification processing. The job acquisition unit may acquire corrected data formed by the external device correcting print data included in the print job so as to correspond to the detected direction, based on the error signal. The print head may print on the medium, based on the corrected data.

In this configuration, even when the printing device is moved in a different direction from the designated direction, printing is performed based on the corrected data corresponding to the direction in which the printing device is moved. Therefore, the printing device can properly print a print image.

The information processing device 1 is an example of the "external device".

In this case, the printing device may have a data correction notification unit functioning as the error processing unit, and a printing-side data correction unit. The printing-side data correction unit may correct print data included in the print job so as to correspond to the detected direction, when receiving an error notification from the data correction notification unit. The print head may print on the medium, based on corrected data, which is the print data that is corrected.

In this configuration, even when the printing device is moved in a different direction from the designated direction, printing is performed based on the corrected data corresponding to the direction in which the printing device is moved. Therefore, the printing device can properly print a print image.

A control method for a printing device printing on a medium while being manually moved in relation to the medium is provided. The control method includes: acquiring a print job designating a direction of movement of the printing device as viewed from the printing device; detecting a direction of movement of the printing device as viewed from the printing device while the printing device is moved; determining whether or not a detected direction, which is the direction of movement of the printing device that is detected, is different from a designated direction, which is the direction of movement of the printing device designated by the print job; and performing error notification processing when the detected direction is determined as being different from the designated direction.

In this configuration, error notification processing is performed when the printing device is moved in a different direction from the designated direction. Therefore, the printing device is restrained from printing a print image inappropriately.

What is claimed is:

1. A printing device printing on a medium while being manually moved in relation to the medium, the printing device comprising:
   a job acquisition unit that is configured to acquire a print job designating a direction of movement of the printing device as viewed from the printing device;
   a print head that is configured to print on the medium, based on the print job, while the printing device is moved;
   a detection unit that is configured to detect a direction of movement of the printing device as viewed from the printing device while the printing device is moved;
   a direction determination unit that is configured to determine whether or not a detected direction, which is the direction of movement of the printing device detected by the detection device, is different from a designated direction, which is the direction of movement of the printing device designated by the print job;
   a notification unit that is configured to notify a user; and
   a notification control unit that is configured to perform error notification processing when the direction determination unit determines that the detected direction is different from the designated direction, and the error notification processing includes notifying the user that the detected direction is different from the designated direction.

2. The printing device according to claim 1, further comprising
   a head control unit that is configured to cause the print head to start printing based on the print job when the direction determination unit determines that a new detected direction, which is detected after the notification unit gives a notification, is the same as the designated direction.

3. The printing device according to claim 1, wherein
   the notification control unit is configured to cause the notification unit to notify the user of the designated direction, as the error notification processing.

4. The printing device according to claim 3, wherein
   the notification control unit is configured to cause the notification unit to notify the user of the designated direction as non-error notification processing before the printing device starts to be moved.

5. The printing device according to claim 4, wherein
   the notification control unit is configured to cause the notification unit to notify the user of the designated direction in different forms between the error notification processing and the non-error notification processing.

6. The printing device according to claim 1, wherein
   the notification unit is provided at an opposite surface that is an outer surface opposite to an outer surface where the print head is provided, of a plurality of outer surfaces of the printing device, and is located at a position corresponding to the print head in a second direction orthogonal to the designated direction within the opposite surface.

7. The printing device according to claim 1, wherein
   the job acquisition unit is configured to acquires the print job from an external device,
   the printing device has an error transmission unit that is configured to function as the error processing unit,
   the error transmission unit transmits an error signal to the external device and thus notifies the external device of an error, as the error notification processing,
   the job acquisition unit acquires corrected data formed by the external device correcting print data included in the print job so as to correspond to the detected direction, based on the error signal, and
   the print head prints on the medium, based on the corrected data.

8. The printing device according to claim 1, further comprising:
   a data correction notification unit that is configured to function as the error processing unit; and
   a printing-side data correction unit, wherein
   the printing-side data correction unit is configured to corrects print data that is included in the print job to correspond to the detected direction, when receiving an error notification from the data correction notification unit, and
   the print head prints on the medium, based on corrected data, which is the print data that is corrected.

9. A control method for a printing device printing on a medium while being manually moved in relation to the medium, the control method comprising:
   acquiring a print job designating a direction of movement of the printing device as viewed from the printing device;
   detecting a direction of movement of the printing device as viewed from the printing device while the printing device is moved;
   determining whether or not a detected direction, which is the direction of movement of the printing device that is detected, is different from a designated direction, which is the direction of movement of the printing device designated by the print job; and
   performing error notification processing when the detected direction is determined as being different from the designated direction by notifying the user that the printing device is being moved in a different direction from the designated direction.

10. A printing device printing on a medium while being manually moved in relation to the medium, the printing device comprising:
    a job acquisition unit that is configured to acquire a print job from an external device and the print job designates a direction of movement of the printing device as viewed from the printing device;
    a print head that is configured to print on the medium, based on the print job, while the printing device is moved;

a detection unit that is configured to detect a direction of movement of the printing device as viewed from the printing device while the printing device is moved;

a direction determination unit that is configured to determine whether or not a detected direction, which is the direction of movement of the printing device detected by the detection device, is different from a designated direction, which is the direction of movement of the printing device designated by the print job; and an error transmission unit that is configured to performing error notification processing when the direction determination unit determines that the detected direction is different from the designated direction and the error notification processing includes transmitting an error signal to the external device and causing the job acquisition unit to acquire corrected data formed by the external device wherein the corrected data is the print job with corrected print data that corresponds with the detected direction and causing the print head to print on the medium based on the corrected data.

* * * * *